US012157310B2

(12) United States Patent
Kida

(10) Patent No.: US 12,157,310 B2
(45) Date of Patent: Dec. 3, 2024

(54) HEAD DRIVE CONTROLLER AND LIQUID DISCHARGE APPARATUS

(71) Applicant: Hitoshi Kida, Kanagawa (JP)

(72) Inventor: Hitoshi Kida, Kanagawa (JP)

(73) Assignee: RICOH COMPANY, LTD., Tokyo (JP)

( * ) Notice: Subject to any disclaimer, the term of this patent is extended or adjusted under 35 U.S.C. 154(b) by 143 days.

(21) Appl. No.: 17/522,907

(22) Filed: Nov. 10, 2021

(65) Prior Publication Data

US 2022/0169019 A1 Jun. 2, 2022

(30) Foreign Application Priority Data

Nov. 27, 2020 (JP) ................................ 2020-197518

(51) Int. Cl.
*B41J 29/38* (2006.01)
*B41J 2/045* (2006.01)

(52) U.S. Cl.
CPC ....... *B41J 2/04588* (2013.01); *B41J 2/04541* (2013.01); *B41J 2/04581* (2013.01); *B41J 2/04593* (2013.01)

(58) Field of Classification Search
CPC ................ B41J 2/04541; B41J 2/04581; B41J 2/04588
See application file for complete search history.

(56) References Cited

U.S. PATENT DOCUMENTS

2003/0043239 A1 3/2003 Yamada et al.
2003/0058306 A1 3/2003 Kobayashi et al.
2003/0142160 A1 7/2003 Kobayashi et al.
2005/0200639 A1 9/2005 Kobayashi et al.
2006/0023010 A1 2/2006 Kobayashi et al.
2006/0132548 A1 6/2006 Yamada et al.
2006/0192801 A1 8/2006 Kobayashi et al.
2007/0002091 A1 1/2007 Kida et al.
2009/0244202 A1 10/2009 Kida et al.
2010/0123909 A1 5/2010 Kida
(Continued)

FOREIGN PATENT DOCUMENTS

JP 6-071876 3/1994
JP 2003-211664 7/2003
(Continued)

OTHER PUBLICATIONS

Office Action issued Jun. 18, 2024 in Japanese Patent Application No. 2020-197518, 5 pages.

*Primary Examiner* — Lam S Nguyen
(74) *Attorney, Agent, or Firm* — XSENSUS LLP

(57) ABSTRACT

A head drive controller to drive a head to discharge a liquid, the head drive controller includes a drive waveform generator configured to generate a drive voltage waveform to drive the head, a switch coupled to the head and the drive waveform generator, the switch configured to select passing or non-passing of the drive voltage waveform generated by the drive waveform generator to the head. The drive voltage waveform includes a first expansion waveform element to expand a pressure chamber in the head, and a second expansion waveform element to expand the pressure chamber, the second expansion waveform element having a slew rate smaller than a slew rate of the first expansion waveform element.

7 Claims, 13 Drawing Sheets

(56) References Cited

U.S. PATENT DOCUMENTS

| | | | |
|---|---|---|---|
| 2015/0070421 A1 | 3/2015 | Kida | |
| 2016/0067961 A1* | 3/2016 | Marchant | B41J 2/04588 347/10 |
| 2018/0056648 A1 | 3/2018 | Lahiri et al. | |
| 2019/0283411 A1 | 9/2019 | Sohgawa | |
| 2021/0162748 A1 | 6/2021 | Kida | |
| 2021/0291517 A1 | 9/2021 | Kida | |

FOREIGN PATENT DOCUMENTS

| | | |
|---|---|---|
| JP | 2016-049697 | 4/2016 |
| JP | 2016-055645 A | 4/2016 |
| JP | 2019-162738 | 9/2019 |

* cited by examiner

HEAD DRIVE CONTROLLER AND LIQUID DISCHARGE APPARATUS

CROSS-REFERENCE TO RELATED APPLICATIONS

This patent application is based on and claims priority pursuant to 35 U.S.C. § 119(a) to Japanese Patent Application No. 2020-197518, filed on Nov. 27, 2020, in the Japan Patent Office, the entire disclosure of which is hereby incorporated by reference herein.

BACKGROUND

Technical Field

Aspect of the present disclosure relates to a head drive controller and a liquid discharge apparatus.

Related Art

In a liquid discharge head, a discharge speed and a discharge amount of liquid vary among nozzles due to, for example, variations in manufacturing.

The liquid discharge head includes a switch to select application or non-application of a drive voltage waveform to a piezoelectric element of the liquid discharge head. The liquid discharge head adjusts a timing at which the switch is turned off in a meniscus-pulling process that expands a pressure chamber to adjust a voltage of the drive voltage waveform to unify the discharge speed of the liquid among the nozzles.

SUMMARY

In an aspect of this disclosure, a head drive controller is configured to drive a head to discharge a liquid. The head drive controller includes a drive waveform generator configured to generate a drive voltage waveform, and a switch coupled to the head and the drive waveform generator, the switch configured to select passing or non-passing of the drive voltage waveform to the head. The drive voltage waveform includes a first expansion waveform element to expand a pressure chamber in the head, and a second expansion waveform element to expand the pressure chamber, the second expansion waveform element having a slew rate smaller than a slew rate of the first expansion waveform element. The switch is configured to select the non-passing of the drive voltage waveform in the second expansion waveform element to trim a portion in the second expansion waveform element of the drive voltage waveform to generate a drive waveform to be applied to the head.

In another aspect of this disclosure, a head drive controller is configured to drive a head to discharge a liquid. The head drive controller includes a drive waveform generator configured to generate a drive voltage waveform, and a switch coupled to the head and the drive waveform generator, the switch configured to select passing or non-passing of the drive voltage waveform to the head. The drive voltage waveform includes a first expansion waveform element to expand a pressure chamber in the head, and a second expansion waveform element to expand the pressure chamber stepwise, the second expansion waveform element including two or more potential holding elements to hold a potential. The switch is configured to select the non-passing of the drive voltage waveform in the second expansion waveform element to trim a portion in the second expansion waveform element of the drive voltage waveform to generate a drive waveform to be applied to the head.

In still another aspect of this disclosure, a head drive controller is configured to drive a head to discharge a liquid. The head drive controller includes a drive waveform generator configured to generate a drive voltage waveform to drive the head, and a switch coupled to the head and the drive waveform generator, the switch configured to select passing or non-passing of the drive voltage waveform generated by the drive waveform generator to the head. The drive voltage waveform includes a first contraction waveform element to contract a pressure chamber in the head, and a second contraction waveform element to contract the pressure chamber, the second contraction waveform element having a slew rate larger than a slew rate of the first contraction waveform element. The switch is configured to select the non-passing of the drive voltage waveform in the first contraction waveform element to trim a portion in the first contraction waveform element of the drive voltage waveform to generate a drive waveform to be applied to the head.

BRIEF DESCRIPTION OF THE DRAWINGS

A more complete appreciation of the disclosure and many of the attendant advantages and features thereof can be readily obtained and understood from the following detailed description with reference to the accompanying drawings, wherein.

Figure 1:
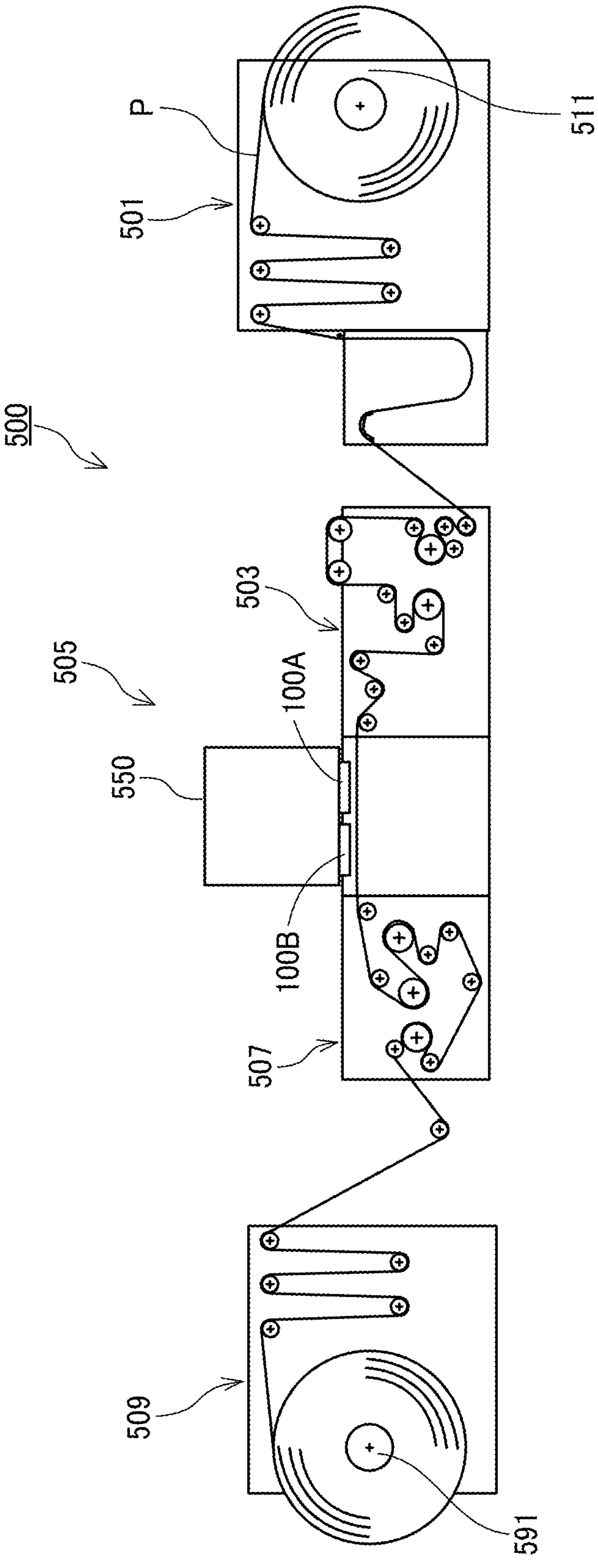
FIG. 1 is a schematic cross-sectional side view of a printer as a liquid discharge apparatus according to a first embodiment of the present disclosure.

The accompanying drawings are intended to depict embodiments of the present invention and should not be interpreted to limit the scope thereof. The accompanying drawings are not to be considered as drawn to scale unless explicitly noted. Also, identical or similar reference numerals designate identical or similar components throughout the several views.

DETAILED DESCRIPTION

In describing embodiments illustrated in the drawings, specific terminology is employed for the sake of clarity. However, the disclosure of this specification is not intended to be limited to the specific terminology so selected and it is to be understood that each specific element includes all technical equivalents that have a similar function, operate in a similar manner, and achieve a similar result.

Referring now to the drawings, embodiments of the present disclosure are described below. As used herein, the singular forms "a", "an", and "the" are intended to include the plural forms as well, unless the context clearly indicates otherwise.

It will also be understood that when an element is referred to as being "connected" or "coupled" to another element, it can be directly connected or coupled to another element or intervening elements may be present. In contrast, when an element is referred to as being "directly connected" or "directly coupled" to another element, there are no intervening elements present. Thus, the term "connected/coupled" includes both direct connections and connections in which there are one or more intermediate connecting elements.

Referring now to the drawings, wherein like reference numerals designate identical or corresponding parts throughout the several views, embodiments of the present disclosure are described below. A printer 500 as a liquid discharge apparatus according to a first embodiment of the present disclosure is described with reference to FIGS. 1 and 2.

FIG. 1 is a schematic side view of the printer 500 according to the first embodiment.

Figure 2:
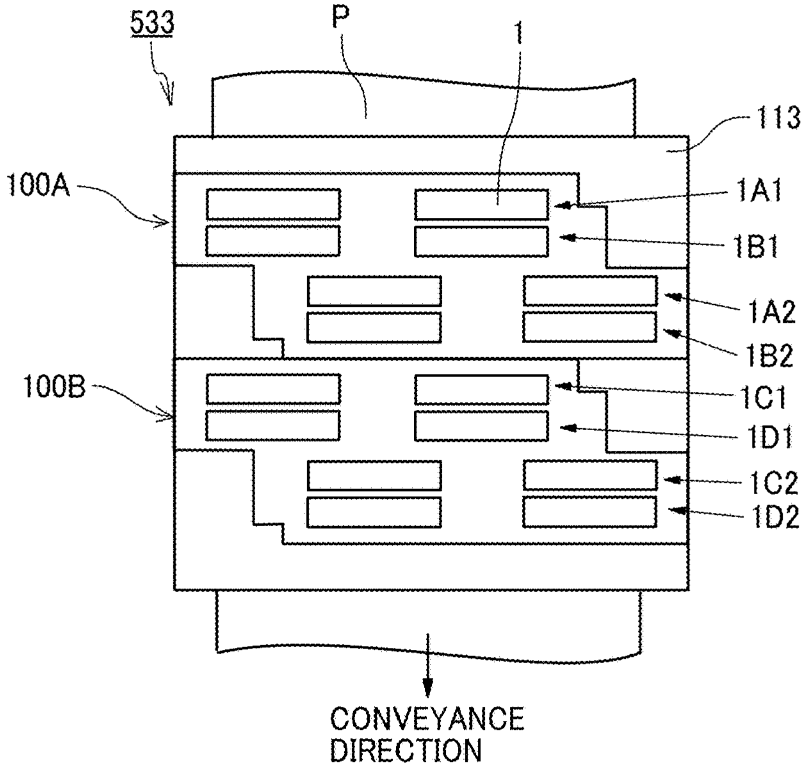
FIG. 2 is an illustration of a discharge unit of the printer of FIG. 1.

FIG. 2 is a schematic plan view of a discharge unit 533 of the printer 500.

The printer 500 as a liquid discharge apparatus includes a loading device 501, a guide conveyor 503, a printing device 505, a drying device 507, and an ejection device 509.

The loading device 501 loads a web-like sheet P as a medium. The guide conveyor 503 guides and conveys the sheet P loaded by the loading device 501 to the printing device 505. The printing device 505 discharge a liquid onto the sheet P to form an image on the sheet P as a printing process. The drying device 507 dries the sheet P on which an image is formed by the printing device 505. The ejection device 509 ejects the sheet P conveyed from the drying device 507.

The sheet P is fed from a winding roller 511 of the loading device 501, guided and conveyed with rollers of the loading device 501, the guide conveyor 503, the drying device 507, and the ejection device 509, and wound around a winding roller 591 of the ejection device 509.

In the printing device 505, the sheet P is conveyed on a conveyance guide to face a head unit 550, and an image is printed on the material P with liquid discharged from the head unit 550.

Here, the head unit 550 includes two head modules 100 (100A and 100B) on a common base member 113 (see FIG. 2).

The head module 100A includes head arrays 1A1, 1B1, 1A2, and 1B2. Each of the head arrays 1A1, 1B1, 1A2, and 1B2 includes multiple heads 1 arranged in a head array direction perpendicular to a conveyance direction of the sheet P as indicated by arrow in FIG. 2. The head module 100B includes head arrays 1C1, 1D1, 1C2, and 1D2. Each of the head arrays 1C1, 1D1, 1C2, and 1D2 includes multiple heads 1 arranged in the head array direction perpendicular to the conveyance direction of the sheet P. The multiple heads 1 in each of the head arrays 1A1 and 1A2 of the head module 100A discharge liquid of the same desired color. Similarly, the head arrays 1B1 and 1B2 of the head module 100A are grouped as one set that discharge liquid of the same desired color. The head arrays 1C1 and 1C2 of the head module 100B are grouped as one set that discharge liquid of the same desired color. The head arrays 1D1 and 1D2 of the head module 100B are grouped as one set to discharge liquid of the same desired color.

Next, an example of the head module 100 according to the first embodiment is described with reference to FIGS. 3 and 4.

Figure 3:
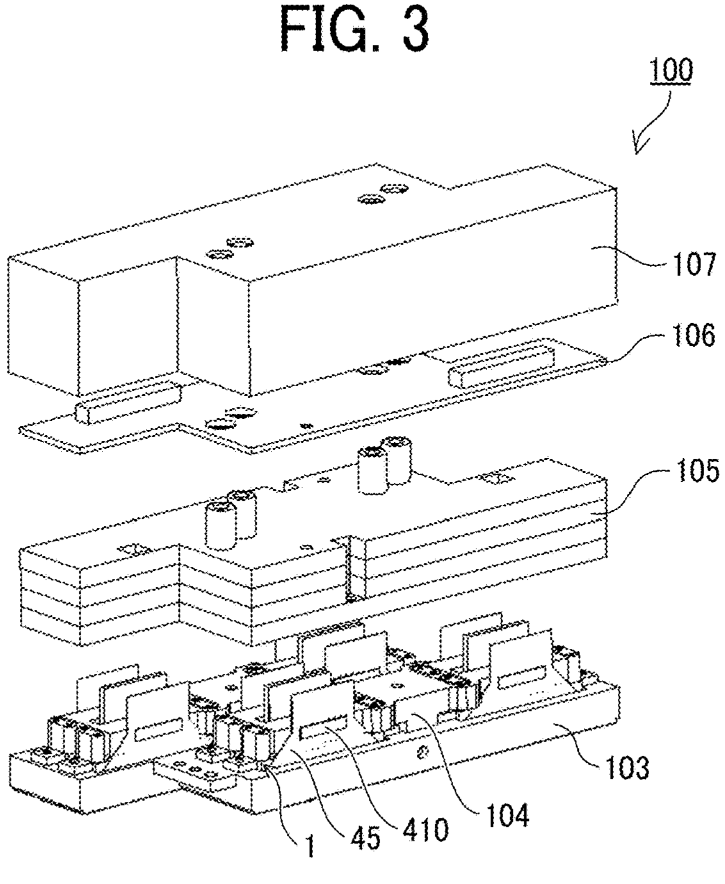
FIG. 3 is an exploded perspective view of a head module in the first embodiment.

FIG. 3 is an exploded perspective view of the head module 100.

Figure 4:
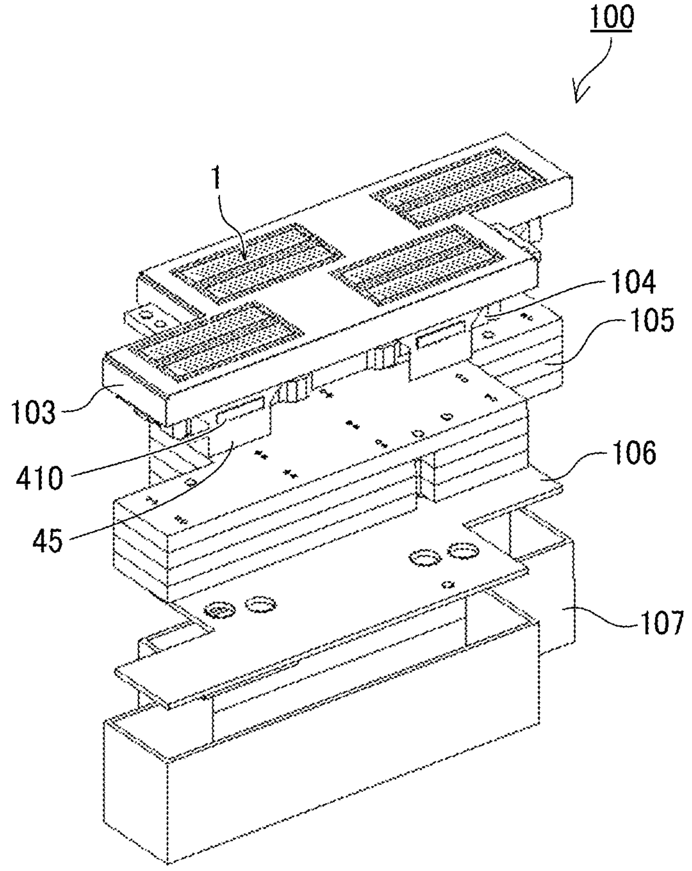
FIG. 4 is an exploded perspective view of the head module viewed from a nozzle surface side of the head module of FIG. 3.

FIG. 4 is an exploded perspective view of the head module 100 as viewed from a nozzle surface of the head module 100.

The head module 100 includes multiple heads 1 that are liquid discharge heads to discharge liquid, and a base member 103 that holds the multiple heads 1.

In addition, the head module 100 includes a heat dissipation member 104, a manifold 105 forming channels to supply liquid to the multiple heads 1, a printed circuit board 106 (PCB) coupled to a flexible wiring board 45 (wiring member), and a module case 107.

Next, an example of the head 1 in the first embodiment is described with reference to FIGS. 5 to 10.

Figure 5:
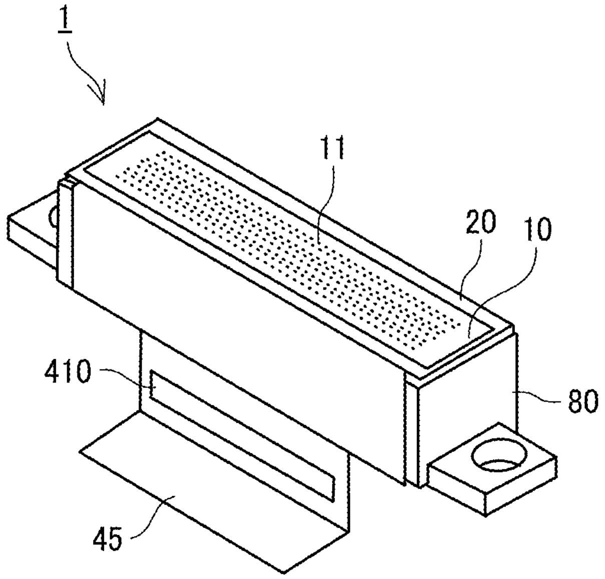
FIG. 5 is an outer perspective view of an example of a head in the first embodiment as viewed from a nozzle surface side.

FIG. 5 is an external perspective view of the head 1 viewed from a nozzle surface of the head 1.

Figure 6:
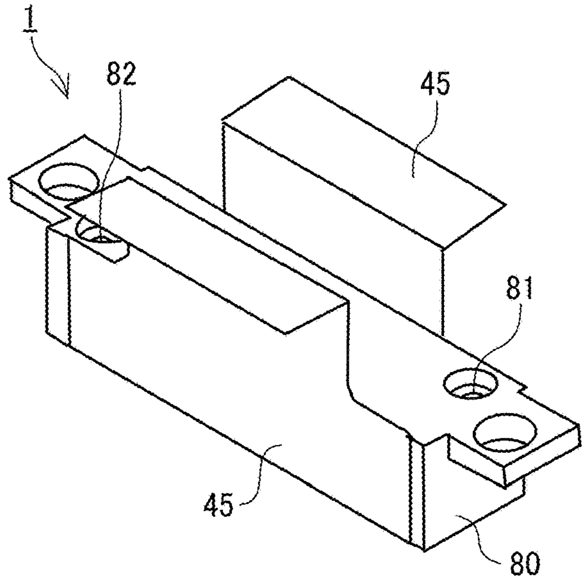
FIG. 6 is an outer perspective view of the head viewed from an opposite side of the nozzle surface side according to the first embodiment of the present disclosure.

FIG. 6 is an outer perspective view of the head 1 viewed from an opposite side of the nozzle surface side according to the first embodiment.

Figure 7:
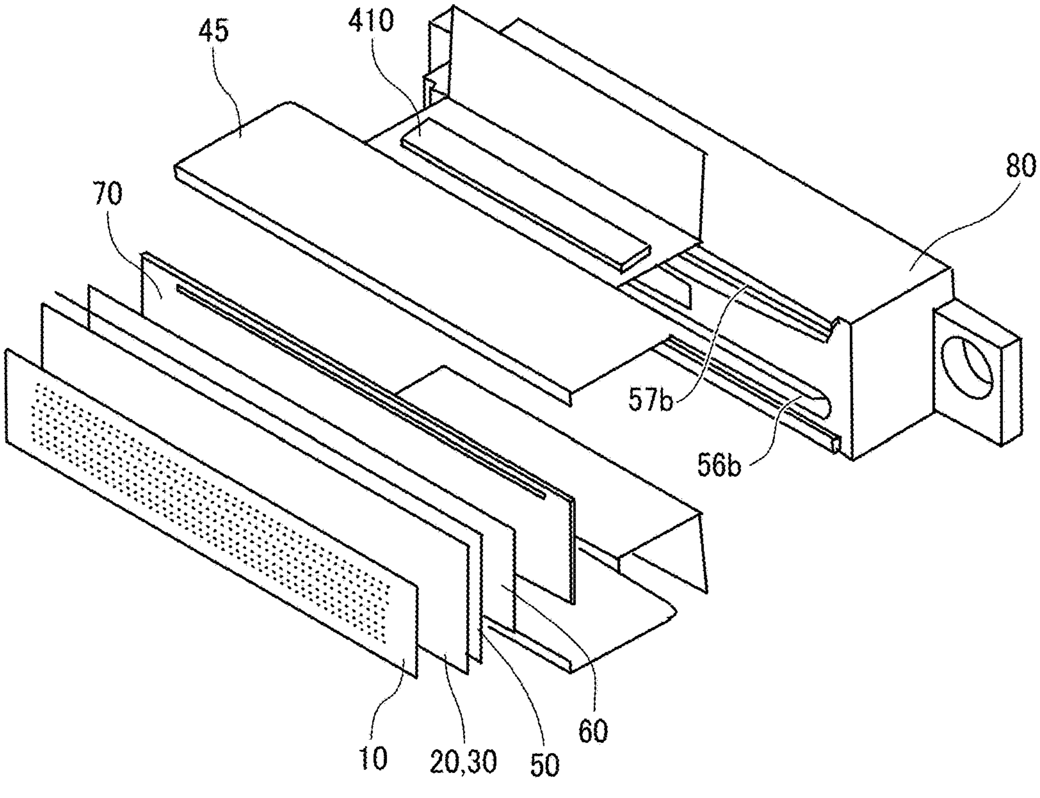
FIG. 7 is an exploded perspective view of the head of FIGS. 5 and 6.

FIG. 7 is an exploded perspective view of the head 1 of FIGS. 5 and 6.

Figure 8:
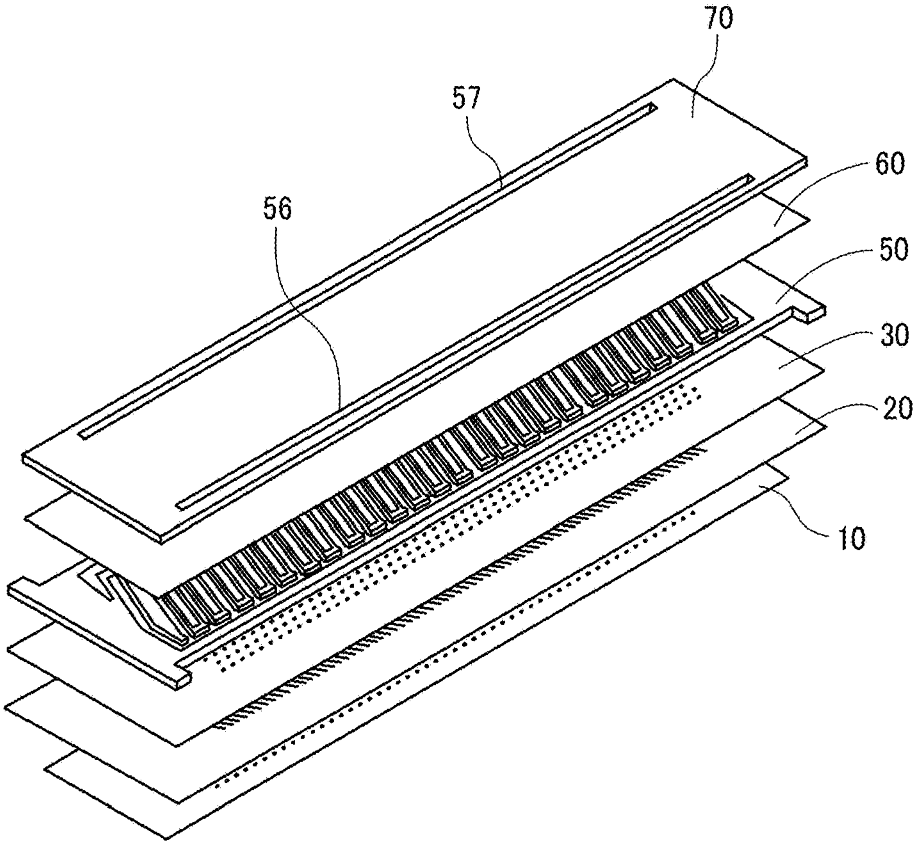
FIG. 8 is an exploded perspective view of a channel forming member of the head according to the first embodiment of the present disclosure.

FIG. 8 is an exploded perspective view of a channel forming member of the head 1 according to the first embodiment.

Figure 9:
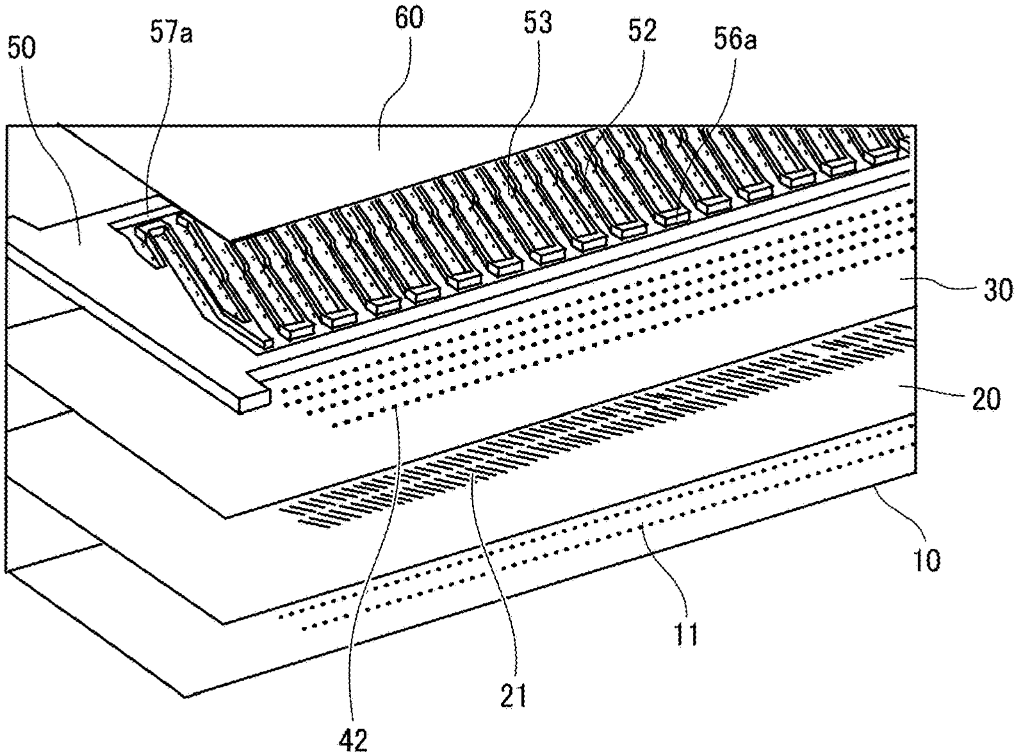
FIG. 9 is an enlarged perspective view of a portion of the channel forming member of FIG. 8.

FIG. 9 is an enlarged perspective view of a portion of the channel forming member of FIG. 8.

Figure 10:
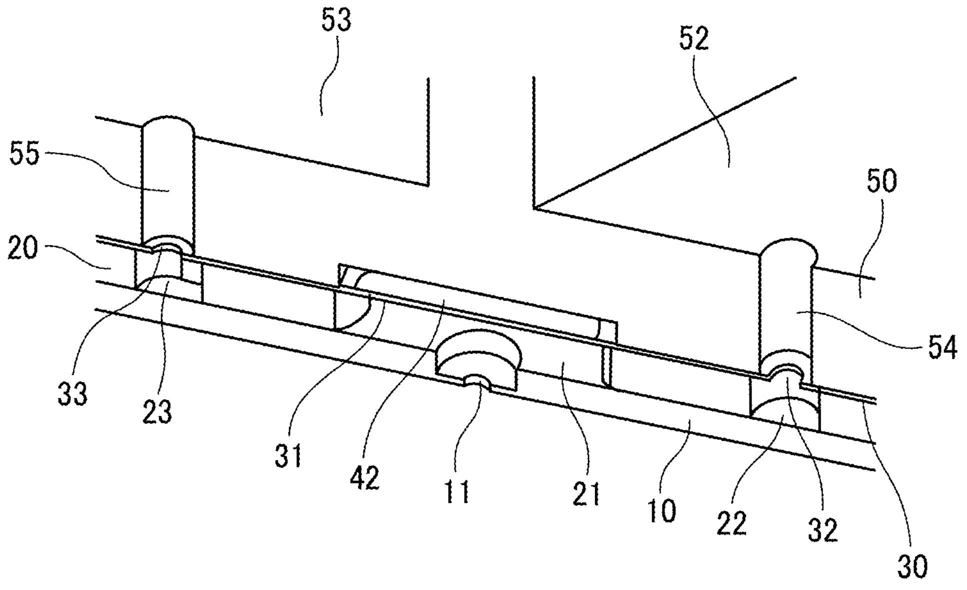
FIG. 10 is a cross-sectional perspective view of channels in the head according to the first embodiment of the present disclosure.

FIG. 10 is a cross-sectional perspective view of channels of the head 1.

The head 1 includes a nozzle plate 10, an individual channel member 20 (channel plate), a diaphragm member 30, a common channel member 50, a damper 60, a common channel member 70, a frame 80, and a flexible wiring board 45 (wiring member). A head driver 410 (driver IC) is mounted on the flexible wiring board 45 (wiring).

The nozzle plate 10 includes multiple nozzles 11 to discharge a liquid. The multiple nozzles 11 are arranged in a two-dimensional matrix.

The head 1 is configured to discharge a liquid from the nozzles 11.

The individual channel member 20 (channel plate) includes multiple pressure chambers 21 (individual chambers) respectively communicating with the multiple nozzles 11, multiple individual supply channels 22 respectively communicating with the multiple pressure chambers 21, and multiple individual collection channels 23 respectively communicating with the multiple pressure chambers 21 (see FIGS. 9 and 10). A combination of one pressure chamber 21, one individual supply channel 22 communicating with one pressure chamber 21, and one individual collection channel 23 communicating with one pressure chamber 21 is collectively referred to as an individual channel.

The diaphragm member 30 forms a diaphragm 31 serving as a deformable wall of the pressure chamber 21. The piezoelectric element 42 is formed on the diaphragm 31 (see FIG. 10) to form a single body. Further, the diaphragm member 30 includes a supply opening 32 that communicates with the individual supply channel 22 and a collection opening 33 that communicates with the individual collection channel 23 (see FIG. 10). The piezoelectric element 42 is a pressure generator that deforms the diaphragm 31 to apply pressure on a liquid in the pressure chamber 21.

The individual channel member 20 and the diaphragm member 30 are not limited to be separate members. For example, the individual channel member 20 and the diaphragm member 30 may be formed by a single member using a Silicon on Insulator (SOI) substrate as a shingle body. That is, an SOI substrate in which a silicon oxide film, a silicon layer, and a silicon oxide film are formed in this order on a silicon substrate can be used. The silicon substrate in the SOI substrate may form the individual channel member 20 (channel member), and the silicon oxide film, the silicon layer, and the silicon oxide film in the SOI substrate may form the diaphragm 31. In such a configuration, the layer structure of the silicon oxide film, the silicon layer, and the silicon oxide film of the SOI substrate configure the diaphragm member 30. Thus, the diaphragm member 30 may be formed by materials formed as films on a surface of the individual channel member 20.

The common channel member 50 also serves as a common-branch channel member. The common channel member 50 includes multiple common-supply branch channels 52 communicating with two or more individual supply channels 22 and multiple common-collection branch channels 53 communicating with two or more individual collection channels 23 (see FIG. 10). The multiple common-supply branch channels 52 and the multiple common-collection branch channels 53 are disposed alternately adjacent to each other (see FIG. 9).

As illustrated in FIG. 10, the common channel member 50 includes a through hole serving as a supply port 54 that connects the supply opening 32 of the individual supply channel 22 and the common-supply branch channel 52, and a through hole serving as a collection port 55 that connects the collection opening 33 of the individual collection channel 23 and the common-collection branch channel 53.

The common channel member 50 includes one or more common-supply main channels 56 (see FIG. 8) communicating with the multiple common-supply branch channels 52 (see FIG. 9), and one or more common-collection main channels 57 (see FIG. 8) communicating with the multiple common-collection branch channels 53 (see FIG. 9). The common channel member 50 includes a part **56*a* as a part of the common-supply main channels 56, and a part 57*a* as a part of the common-collection main channels 57 (see FIG. 9**).

The damper 60 includes a supply-side damper that faces (opposes) the supply port 54 of the common-supply branch channel 52 and a collection-side damper that faces (opposes) the collection port 55 of the common-collection branch channel 53.

As illustrated in FIG. 9, the damper 60 seals grooves alternately arrayed in the same common channel member 50 to form the common-supply branch channels 52 and the common-collection branch channels 53. Thus, the damper 60 forms a deformable wall of the common-supply branch channels 52 and the common-collection branch channels 53.

The common channel member 70 forms a common-supply main channel 56 communicating with the multiple common-supply branch channels 52 and a common-collection main channel 57 communicating with the multiple common-collection branch channels 53 (see FIG. 8). The common channel member 70 is a common-main channel member.

The frame 80 includes a part **56*b* of the common-supply main channel 56 and a part 57*b* of the common-collection main channel 57 (see FIGS. 7 and 8). The part 56*b* of the common-supply main channel 56 communicates with the supply port 81 (see FIG. 6) in the frame 80. The part 57*b* of the common-collection main channel 57 communicates with the collection port 82 (see FIG. 6) in the frame 80**.

In the head 1, the liquid is supplied from the common-supply main channel 56 (see FIG. 8), flowing through the common-supply branch channel 52 (see FIG. 9) and the supply port 54 to the pressure chamber 21 (see FIG. 10), and is discharged from the nozzle 11 (see FIG. 10). The liquid not discharged from the nozzle 11 is collected from the collection port 55 (see FIG. 10), flowing through the common-collection branch channel 53 (see FIG. 10) to the common-collection main channel 57 (see FIG. 8), and is discharged outside the head 1 from the collection port 82 (see FIG. 6) to an external circulation device, and is supplied again to the common-supply main channel 56 through the supply port 81 (see FIG. 6).

Next, a head drive controller 400 according to the first embodiment of the present disclosure is described with reference to FIG. 11.

Figure 11:
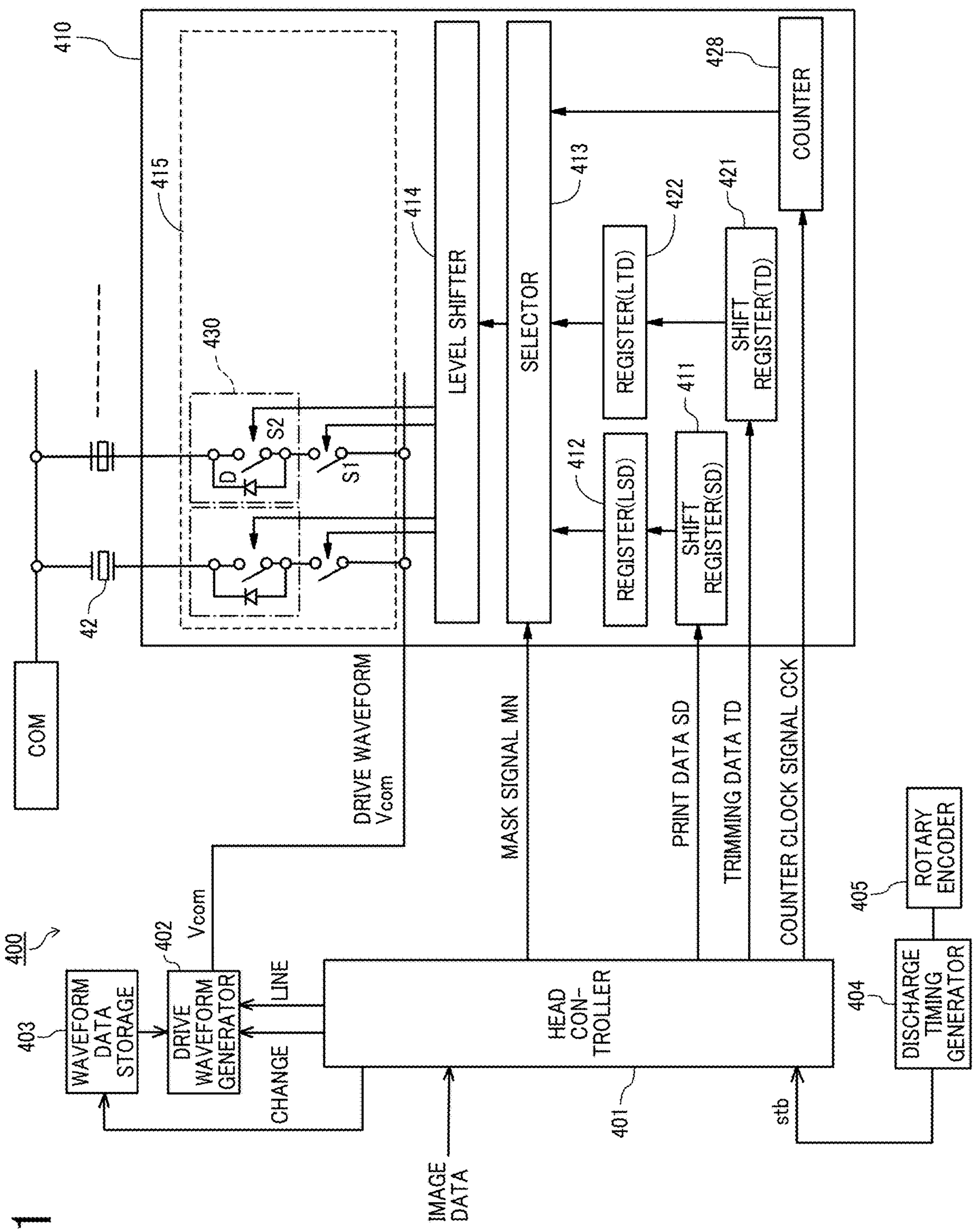
FIG. 11 is a block diagram of the head drive controller according to the first embodiment of the present disclosure.

FIG. 11 is a block diagram of the head drive controller 400 according to the first embodiment.

The head drive controller 400 includes a head controller 401, a drive waveform generator 402 and a waveform data storage 403, a head driver 410, and a discharge timing generator 404 to generate a discharge timing from an output of a rotary encoder 405. The head controller 401 is also referred to as circuitry.

In response to a reception of a discharge timing pulse stb, the head controller 401 outputs a discharge synchronization signal LINE that triggers generation of a common drive waveform Vcom, to the drive waveform generator 402. The head controller 401 outputs a discharge timing signal CHANGE corresponding to an amount of delay from the discharge synchronization signal LINE, to the drive waveform generator 402.

The drive waveform generator 402 generates and outputs a common drive waveform Vcom at a timing based on the discharge synchronization signal LINE and the discharge timing signal CHANGE.

The head controller 401 receives image data and generates, based on the image data, a mask signal MN to control a presence or an absence of a liquid discharge operation from each nozzle 11 of the head 1. The mask signal MN is a signal at a timing synchronized with the discharge timing signal CHANGE.

The head controller 401 transfers print data SD, trimming data TD, a counter clock signal CCK, and the generated mask signal MN to the head driver 410.

The head driver 410 is a selector to select a waveform portion to be applied to each piezoelectric element 42 of the head 1 from the common drive waveform Vcom, based on various signals from the head controller 401.

The head driver 410 includes a shift register 411, a register 412, a selector 413, a level shifter 414, and a switch array 415.

The head driver 410 further includes a shift register 421, a register 422, and a counter 428.

The shift register 411 receives the print data SD transferred from the head controller 401. The register 412 stores each register value of the shift register 411.

Similarly, the shift register 421 receives the trimming data TD from the head controller 401. The register 422 stores each register value of the shift register 421.

The selector 413 is a selector to output signals to turn on or turn off a first switch 51. The first switch 51 selects the nozzle 11 (piezoelectric element 42) to which the common drive waveform Vcom is applied, based on the values (print data SD) stored in the register 412 and the mask signals MN.

The selector 413 inputs a value (trimming data TD) stored in the register 422 and an output signal (count value) from the counter 428.

The selector 413 outputs a signal to turn off the second switch S2 when a count result of the counter 428 reaches a value of the trimming data TD according to the trimming data TD held in the register 422.

The level shifter 414 converts a level of a logic level voltage signal of the selector 413 to a level at which the second switch S2 of the switch array 415 is operatable.

The switch array 415 includes a first switch S1 and a switching unit 430. The first switch S1 selects a piezoelectric element 42 (nozzle 11) to which a drive voltage waveform is applied. The switching unit 430 selects passing or non-passing (blocking) of the drive voltage waveform, in other words, application or non-application of the drive voltage waveform to the piezoelectric element 42. Each piezoelectric element 42 has a first side and a second side opposite the first side. The first side is coupled to the switching unit 430 and the second side is coupled to GND or COM which is at a substantially constant voltage.

Each of the first switch S1 and the second switch S2 of the switching unit 430 is an analog switch in the first embodiment. The analog switch serves as a switching element to be turned on or turned off according to an output of the selector 413 supplied to the switch array 415 through the level shifter 414.

The head driver 410 includes the switching unit 430 for each nozzle 11 in the head 1. The second switch S2 of the switching unit 430 is coupled to each individual electrode of the corresponding piezoelectric element 42. The first switch S1 inputs the common drive waveform Vcom from the drive waveform generator 402.

Then, the first switch S1 selects the piezoelectric element 42 (nozzle 11), to which the common drive waveform Vcom is applied, according to the output of the selector 413 supplied via the level shifter 414. When the common drive waveform Vcom includes multiple drive waveforms (drive pulses), one or more drive pulses is selected to control a size of liquid droplets discharged from the nozzle 11 and the like so that the head 1 can discharge liquid droplets of different sizes.

When the first switch S1 is turned on (in an ON-state), the second switch S2 of the switching unit 430 is switched to be turned on (ON-state) or turned off (OFF-state). Thus, the switching unit 430 selects passing or non-passing (blocking) of the common drive waveform Vcom to adjust (trim) the drive voltage waveform applied to the piezoelectric element 42 corresponding to each nozzle 11.

The discharge timing generator 404 generates and outputs the discharge timing pulse stb each time the sheet P is conveyed by a predetermined amount, based on a detection result of the rotary encoder 405. The rotary encoder 405 includes an encoder wheel that rotates in accordance with the movement of the sheet P and an encoder sensor that reads slits of the encoder wheel.

Next, the head drive controller 400 according to a first embodiment of the present disclosure is described with reference to FIGS. 12 and 13.

Figure 12:
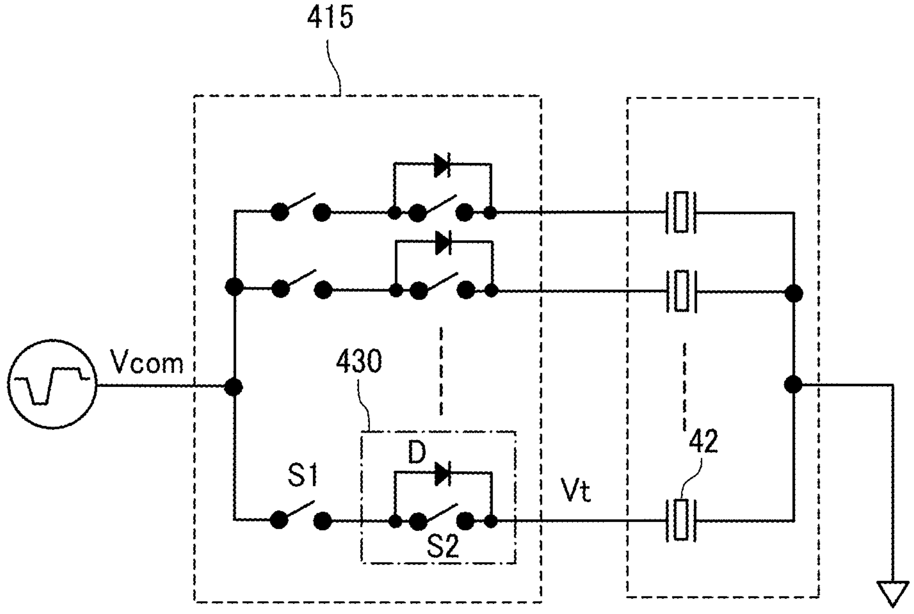
FIG. 12 is a circuit diagram of a portion of a switch array to adjust a drive voltage waveform of a head driver according to the first embodiment.

FIG. 12 is a circuit diagram of a portion of the switch array 415 to adjust a drive voltage waveform of the head driver 410 according to the first embodiment.

Figure 13:
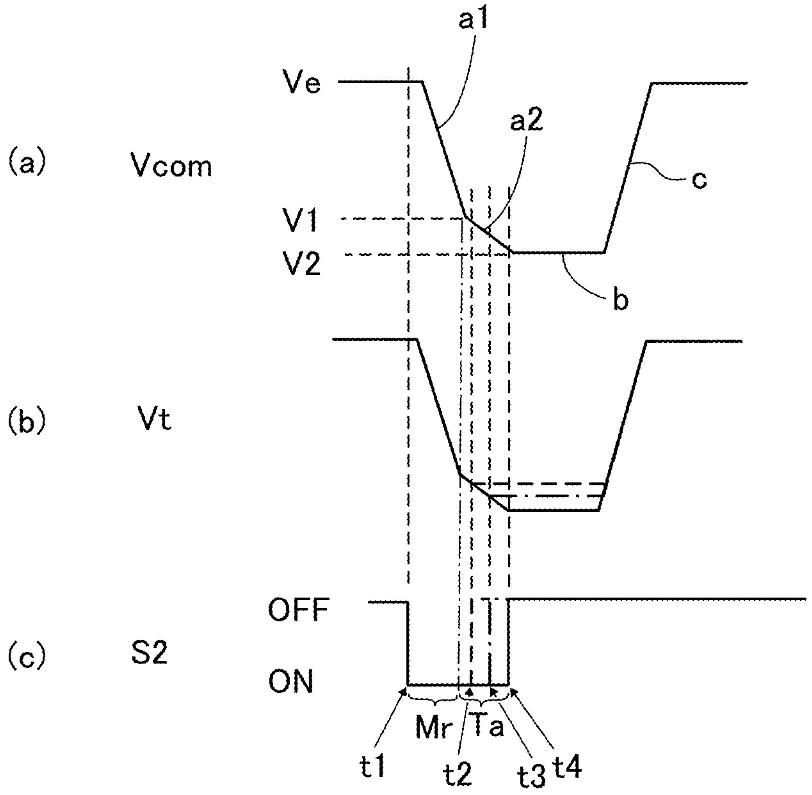
FIG. 13 is a waveform chart illustrating the drive voltage waveform of the head driver according to the first embodiment.

FIG. 13 is a waveform chart illustrating the drive voltage waveform of the head driver 410 according to the first embodiment.

The switch array 415 in the first embodiment includes switching units 430 coupled in series to the first switching S1 for each nozzle 11. The switching unit 430 is a switch to select passing or non-passing of the common drive waveform Vcom as a drive voltage waveform applied to the piezoelectric element 42 of the head 1. The switching unit 430 includes a parallel circuit of the second switch S2 and a diode "D".

The common drive waveform Vcom is input to the parallel circuit (switching unit 430) of the second switch S2 and the diode D via the first switch S1. Then, a drive waveform Vt generated by trimming the common drive waveform Vcom is applied to an individual electrode of the piezoelectric element 42.

The first switch S1 selects application or non-application of the drive voltage waveform to the piezoelectric element 42. That is, the first switch S1 selects the piezoelectric element 42 (nozzle 11) to which the common drive waveform Vcom as a drive voltage waveform is applied. The head drive controller 400 in the first embodiment includes the first switch S1 on a front stage (left side in FIG. 12) of the second switch S2. However, the first switch S1 may be disposed on a rear stage (right side in FIG. 12) of the second switch S2.

The second switch S2 is a trimming switch. The second switch S2 is controlled to be turned on or turned off based on trimming data Td and count data of the counter 428. The second switch S2 selects a waveform portion of the common drive waveform Vcom to be passed through the second switch S2 to the piezoelectric element 42 (nozzle 11) to which the first switch S1 selects to apply the common drive waveform Vcom.

Diodes D are respectively coupled in parallel with the second switches S2. Anodes of the diodes D are respectively coupled to input ends of the second switches S2 from each of which the common drive waveform Vcom is input to the second switch S2. Cathodes of the diodes D are respectively coupled to the individual electrodes of the piezoelectric elements 42. That is, the cathodes of the diodes D are respectively coupled to output ends of the second switches S2.

Thus, the diode D is coupled to the second switch S2 in a direction opposite to a falling waveform element of the drive voltage waveform. The falling waveform element in the first embodiment is an expansion waveform element that expands the pressure chamber 21. Conversely, the diode D is coupled to the second switch S2 in a forward direction with respect to a rising waveform element of the drive voltage waveform. The rising waveform element in the first embodiment is a contraction waveform element that contracts the pressure chamber 21. Thus, the rising waveform element of a potential equal to or higher than a holding potential of the piezoelectric element 42 passes through the diode D. In other words, the piezoelectric element 42 is charged via the diode D.

The switching unit 430 in the first embodiment inputs the common drive waveform Vcom having a drive voltage waveform illustrated in FIG. 13, for example.

The common drive waveform Vcom is a discharge waveform to pressurize a liquid in the pressure chamber 21 to discharging the liquid from the nozzle 11. The common drive waveform Vcom includes a first expansion waveform element a1, a second expansion waveform element a2, a holding waveform element b, and a contraction waveform element c in time series. The second expansion waveform element a2 is disposed after the first expansion waveform element a1 in time series in the first embodiment.

The first expansion waveform element a1 decreases from a reference potential Ve to a potential V1 to expand the pressure chamber 21. The reference potential Ve is also referred to as an intermediate potential. The second expansion waveform element a2 decreases from the potential V1 of the first expansion waveform element a1 to a potential V2 to further expand the pressure chamber 21. The potential V1 is a falling end potential of the first expansion waveform element a1.

The second expansion waveform element a2 is a waveform element, a changing amount per unit time of which is smaller than a changing amount per unit time of the first expansion waveform element a1. Hereinafter, the changing amount per unit time is also referred to as a "slew rate". In other words, the second expansion waveform element a2 is a waveform element, a falling time constant "tr" of which is larger than a falling time constant tr of the first expansion waveform element a1.

The holding waveform element b holds the potential V2 that is fallen from the potential V1 by the second expansion waveform element a2. The contraction waveform element c rises from the potential V2 held by the holding waveform element b to the reference potential Ve to contract the pressure chamber 21 and discharge the liquid from the nozzle 11.

The drive voltage waveform according to the first embodiment thus configured controls a transition of the second switch S2 from an ON-state to an OFF-state by using, as a trimming area Ta, a time region of the second expansion waveform element a2 having a slew rate smaller than a slew rate of an expansion process of the pressure chamber 21 by the first expansion waveform element a1. The head drive controller 400 turns off the second switch S2 to block the common drive waveform Vcom not to pass through the second switch S2 (non-passing state).

For example, as illustrated in FIG. 13(*c*), the second switch S2 is turned on (ON-state) at a time point t1 before a falling start time point of the first expansion waveform element a1. Then, the second switch S2 is turned off (OFF-state) at a time point after a falling start time point of the second expansion waveform element a2 and before a falling end time point of the second expansion waveform element S2.

As a result, a drive waveform Vt (trimming waveform) applied to the piezoelectric element 42 is held at a potential at which the second switch S2 is turned off (OFF-state), and then rises in accordance with a waveform portion of the contraction waveform element c, a potential of which is equal to or higher than the held potential as illustrated in FIG. 13(*b*).

At a time point t2 in FIG. 13(*c*), the second switch S2 is turned off (OFF-state) as indicated by a broken line, for example. At this time, as indicated by a broken line in FIG. 13(*b*), the drive waveform Vt is held at a potential at the time point t2 of the second expansion waveform element a2 and rises from the held potential.

At a time point t3 in FIG. 13(*c*), the second switch S2 is turned off (OFF-state) as indicated by a dash-single-dot line. At this time, the drive waveform Vt is held at a potential at the time point t3 of the second expansion waveform element a2 as indicated by the dash-single-dot line in FIG. 13(*b*), and rises from the held potential.

At a time point t4 in FIG. 13(*c*), the second switch S2 is turned off (OFF-state) as indicated by a solid line. At this time, the drive waveform Vt is held at a potential at the time point t4 of the second expansion waveform element a2 as indicated by the solid line in FIG. 13(*b*), and rises from the held potential.

As described above, the second expansion waveform element a2 is formed as the trimming area Ta after a meniscus-pulling process Mr in which a meniscus of a liquid in the nozzle 11 is pulled by an expansion of the pressure chamber 21 by the first expansion waveform element a1. The second expansion waveform element a2 serves as a voltage drop portion of the drive voltage waveform having a reduced slew rate smaller than the slew rate of the first expansion waveform element a1. Then, the head drive controller 400 adjusts a timing at which the second switch S2 is switched from the ON-state (passing state) to the OFF-state (non-passing state) in the trimming area Ta to trim the drive voltage waveform (common drive waveform Vcom). The second switch S2 is used to trim the drive voltage waveform (common drive waveform Vcom).

The circuitry (head controller 401) is configured to turn off the switch (second switch S2) in the second expansion waveform element a2 to cause the switch (second switch S2) to select the non-passing in the second expansion waveform element a2 to trim a portion in the second expansion waveform element a2 to generate a drive waveform Vt to be applied to the head 1.

An amount of a voltage change when an OFF timing of the second switch S2 in the trimming area Ta is shifted by several tens of nanoseconds is much smaller than an amount of voltage change when the OFF timing of the second switch S2 in the meniscus-pulling process Mr is shifted by several tens of nanoseconds. As a result, the discharge characteristics are not significantly shifted, and the head drive controller 400 thus can reduce variations in the discharge characteristics.

Thus, the head drive controller 400 is configured to drive a head 1 to discharge a liquid. The head drive controller 400 includes a drive waveform generator 402 configured to generate a drive voltage waveform Vcom to drive the head 1, a switch (second switch S2) coupled to the head 1 and the drive waveform generator 402, the switch (second switch S2) configured to select passing or non-passing of the drive voltage waveform Vcom generated by the drive waveform generator 402 to the head 1.

The drive voltage waveform Vcom includes a first expansion waveform element a1 to expand a pressure chamber 21 in the head 1, and a second expansion waveform element a2 to expand the pressure chamber 21, the second expansion waveform element a2 having a slew rate smaller than a slew rate of the first expansion waveform element a1.

The switch (second switch S2) is configured to select the non-passing of the drive voltage waveform Vcom in the second expansion waveform element a2 to trim a portion in the second expansion waveform element a2 of the drive voltage waveform a2 to generate a drive waveform Vt to be applied to the head 1.

Next, the head drive controller 400 according to a second embodiment of the present disclosure is described with reference to FIG. 14.

Figure 14:
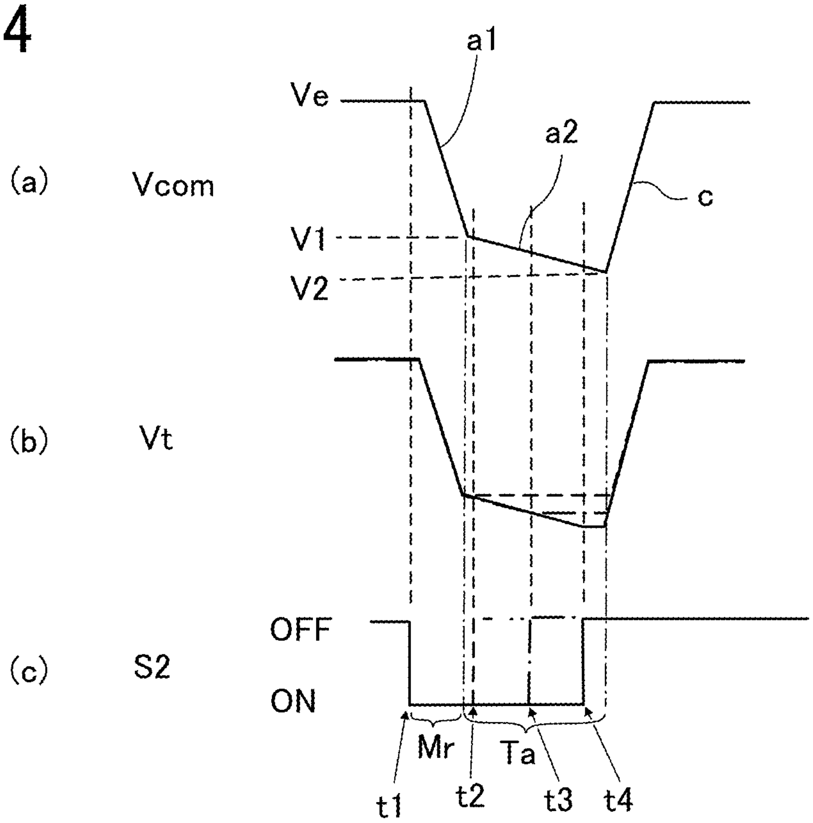
FIG. 14 is a waveform chart of the drive voltage waveform of the head drive controller according to a second embodiment of the present disclosure.

FIG. 14 is a waveform chart of the drive voltage waveform of the head drive controller 400 according to the second embodiment.

A configuration of the switch array 415 of the head driver 410 in the second embodiment is made similar to the configuration of the switch array 415 in the first embodiment (see FIG. 12).

The switching unit 430 in the second embodiment inputs the common drive waveform Vcom having a drive voltage waveform illustrated in FIG. 14(*a*), for example.

The common drive waveform Vcom is a discharge waveform to pressurize the liquid in the pressure chamber 21 and discharge the liquid from the nozzle 11. The common drive waveform Vcom includes the first expansion waveform element a1, the second expansion waveform element a2, and the contraction waveform element c in time series.

The falling waveform element a1 falls from a reference potential Ve to a potential V1 to expand the pressure chamber 21. The second expansion waveform element a2 decreases from the potential V1 of the first expansion waveform element a1 to a potential V2 to further expand the pressure chamber 21. The potential V1 is a falling end potential of the first expansion waveform element a1.

The second expansion waveform element a2 is a waveform element, a slew rate (changing amount per unit time) of which is smaller than a slew rate of the first expansion waveform element a1. In other words, the second expansion waveform element a2 is a waveform element, a falling time constant "tr" of which is larger than a falling time constant tr of the first expansion waveform element a1.

The contraction waveform element c rises from the potential V2 at a falling end of the second expansion waveform element a2 to the reference potential Ve to contract the pressure chamber 21 and discharge the liquid from the nozzle 11. That is, the second expansion waveform element a2 bridges the first expansion waveform element a1 and the contraction waveform element c.

The drive voltage waveform according to the second embodiment thus configured controls a transition of the second switch S2 from an ON-state to an OFF-state by using, as the trimming area Ta, a time region of the second expansion waveform element a2 having a slew rate smaller than a slew rate of an expansion process of the pressure chamber 21 by the first expansion waveform element a1. The head drive controller 400 turns off the second switch S2 to block the common drive waveform Vcom not to pass through the second switch S2 (non-passing state).

For example, as illustrated in FIG. 14(*c*), the second switch S2 is turned on (ON-state) at a time point t1 before a falling start time point of the first expansion waveform element a1. Then, the second switch S2 is turned off (OFF-state) at a time point after a falling start time point of the second expansion waveform element a2 and before a falling end time point of the second expansion waveform element a2.

As a result, a drive waveform Vt applied to the piezoelectric element 42 is held at a potential at which the second switch S2 is turned off (OFF-state), and then rises in accordance with a waveform portion of the contraction waveform element c, a potential of which is equal to or higher than the held potential as illustrated in FIG. 14(*b*).

At a time point t2 in FIG. 14(*c*), the second switch S2 is turned off (OFF-state) as indicated by a broken line, for example. At this time, as indicated by a broken line in FIG. 14(*b*), the drive waveform Vt is held at a potential at the time point t2 of the second expansion waveform element a2 and rises in accordance with a waveform portion of the contraction waveform element c having a potential equal to or higher than the held potential.

At a time point t3 in FIG. 14(*c*), the second switch S2 is turned off (OFF-state) as indicated by a dash-single-dot line. At this time, the drive waveform Vt is held at a potential at the time point t3 of the second expansion waveform element a2 as indicated by the dash-single-dot line in FIG. 14(*b*), and rises from the waveform portion of the contraction waveform element c having the potential equal to or higher than the held potential.

At a time point t4 in FIG. 14(*c*), the second switch S2 is turned off (OFF-state) as indicated by a solid line. At this time, the drive waveform Vt is held at a potential at the time point t4 of the second expansion waveform element a2 as indicated by the solid line in FIG. 14(*b*), and rises from the waveform portion of the contraction waveform element c having a potential equal to or higher than the held potential.

As described above, the second expansion waveform element a2 is formed as the trimming area Ta after a meniscus-pulling process Mr in which a meniscus of a liquid in the nozzle 11 is pulled by an expansion of the pressure chamber 21 by the first expansion waveform element a1. The second expansion waveform element a2 serves as a voltage drop portion of the drive voltage waveform having a reduced slew rate smaller than the slew rate of the first expansion waveform element a1. Then, the head drive controller 400 adjusts a timing at which the second switch S2 is switched from the ON-state (passing state) to the OFF-state (non-passing state) in the trimming area Ta to trim the drive voltage waveform (common drive waveform Vcom). The second switch S2 is used to trim the drive voltage waveform (common drive waveform Vcom).

An amount of a voltage change when an OFF timing of the second switch S2 in the trimming area Ta is shifted by several tens of nanoseconds is much smaller than an amount of voltage change when the OFF timing of the second switch S2 in the meniscus-pulling process Mr is shifted by several tens of nanoseconds. As a result, the discharge characteristics are not significantly shifted, and the head drive controller 400 thus can reduce variations in the discharge characteristics.

The drive voltage waveform in the second embodiment does not include the holding waveform element b in the first embodiment, the drive voltage waveform in the second embodiment can further reduce a changing amount per unit time of the second expansion waveform element a2 as compared with the first embodiment (see FIG. 13). Accordingly, the drive voltage waveform in the second embodiment can further reduce a deviation of the discharge characteristics with respect to the deviation amount of the OFF timing of the second switch S2.

Next, the head drive controller 400 according to a third embodiment of the present disclosure is described with reference to FIG. 15.

Figure 15:
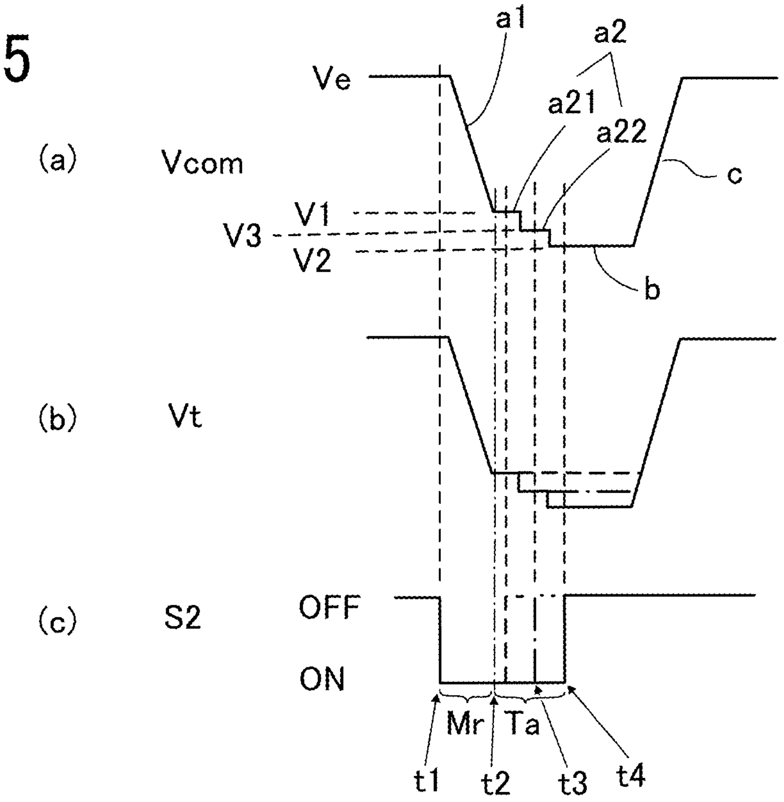
FIG. 15 is a waveform chart of the drive voltage waveform of the head drive controller according to a third embodiment of the present disclosure.

FIG. 15 is a waveform chart of the drive voltage waveform of the head drive controller 400 according to the third embodiment.

A configuration of the switch array 415 of the head driver 410 in the second embodiment is made similar to the configuration of the switch array 415 in the first embodiment (see FIG. 12).

The switching unit 430 in the third embodiment inputs the common drive waveform Vcom having a drive voltage waveform illustrated in FIG. 15(*a*), for example.

The common drive waveform Vcom is a discharge waveform to pressurize the liquid in the pressure chamber 21 and discharge the liquid from the nozzle 11. The common drive waveform Vcom includes a first expansion waveform element a1, a second expansion waveform element a2, a holding waveform element b, and a contraction waveform element c in time series.

The falling waveform element a1 falls from a reference potential Ve to a potential V1 to expand the pressure chamber 21. The second expansion waveform element a2 decreases stepwise from the potential V1 of the first expansion waveform element a1 to a potential V2 to further expand the pressure chamber 21. The potential V1 is a falling end potential of the first expansion waveform element a1.

The second expansion waveform element a2 includes a waveform element a21 and a waveform element a22. The waveform element a21 is a potential holding element to hold the potential V1. The waveform element a22 is a potential holding element that holds the potential V3 (V3<V1). Thus, the second expansion waveform element a2 includes two or more potential holding elements (waveform elements a21 and a22).

The holding waveform element b holds the potential V2 that is fallen from the potential V1 by the second expansion waveform element a2.

The contraction waveform element c rises from the potential V2 held by the holding waveform element b to the reference potential Ve to contract the pressure chamber 21 and discharge the liquid from the nozzle 11.

The head drive controller 400 according to the third embodiment thus configured controls a transition of the second switch S2 from an ON-state to an OFF-state by using, as the trimming area Ta, a time region a potential holding portion of the second expansion waveform element a2 after falling of the potential by the first expansion waveform element a1. The head drive controller 400 turns off the second switch S2 to block the common drive waveform Vcom not to pass through the second switch S2 (non-passing state).

For example, as illustrated in FIG. 15(*c*), the second switch S2 is turned on (ON-state) at a time point t1 before a falling start time point of the first expansion waveform element a1. Then, the second switch S2 is turned off (OFF-state) at any one of a time point of the waveform element a21, the waveform element a22, or the holding waveform element b. The waveform elements a21 and a22 are potential holding portions of the second expansion waveform element a2.

As a result, a drive waveform Vt applied to the piezoelectric element 42 is held at a potential at which the second switch S2 is turned off (OFF-state), and then rises in accordance with a waveform portion of the contraction waveform element c, a potential of which is equal to or higher than the held potential as illustrated in FIG. 15(*b*).

At a time point t2 in FIG. 15(*c*), the second switch S2 is turned off (OFF-state) as indicated by a broken line, for example. At this time, as indicated by a broken line in FIG. 15(*b*), the drive waveform Vt is held at the potential V1 at the time point t2 of the waveform element a21 of the second expansion waveform element a2, and then rises in accordance with a waveform portion of the contraction waveform element c, a potential of which is equal to or higher than this held potential V1.

At a time point t3 in FIG. 15(*c*), the second switch S2 is turned off (OFF-state) as indicated by a dash-single-dot line. At this time, the drive waveform Vt is held at the potential V3 at the time point t3 of the waveform element a22 of the second expansion waveform element a2 as indicated by the dash-single-dot line in FIG. 15(*b*), and rises in accordance with a waveform portion of the contraction waveform element c, a potential of which is equal to or higher than this held potential V3.

At a time point t4 in FIG. 15(*c*), the second switch S2 is turned off (OFF-state) as indicated by a solid line. At this time, the drive waveform Vt is held at the potential V2 at the time point t4 of the holding waveform element b1 as indicated by the solid line in FIG. 15(*b*), and rises in accordance with a waveform portion of the contraction waveform element c, a potential of which is equal to or higher than this held potential V2.

As described above, the second expansion waveform element a2 is formed as the trimming area Ta after a meniscus-pulling process Mr in which a meniscus of a liquid in the nozzle 11 is pulled by an expansion of the pressure chamber 21 by the first expansion waveform element a1. The second expansion waveform element a2 serves as a voltage drop portion of the drive voltage waveform to expand the pressure chamber 21 stepwise.

Then, the head drive controller 400 adjusts a timing at which the second switch S2 is switched from the ON-state to the OFF-state in the potential holding portion a21 or a22 of the second expansion waveform element a2 in the trimming area Ta to trim the drive voltage waveform (common drive waveform Vcom). The second switch S2 is used to trim the drive voltage waveform (common drive waveform Vcom).

An amount of a voltage change when an OFF timing of the second switch S2 in the potential holding portion a21 or a22 in the trimming area Ta is shifted by several tens of nanoseconds is much smaller than an amount of voltage change when the OFF timing of the second switch S2 in the meniscus-pulling process Mr is shifted by several tens of nanoseconds. As a result, the discharge characteristics are not significantly shifted, and the head drive controller 400 thus can reduce variations in the discharge characteristics.

Next, the head drive controller 400 according to a fourth embodiment of the present disclosure is described with reference to FIGS. 16 and 17.

Figure 16:
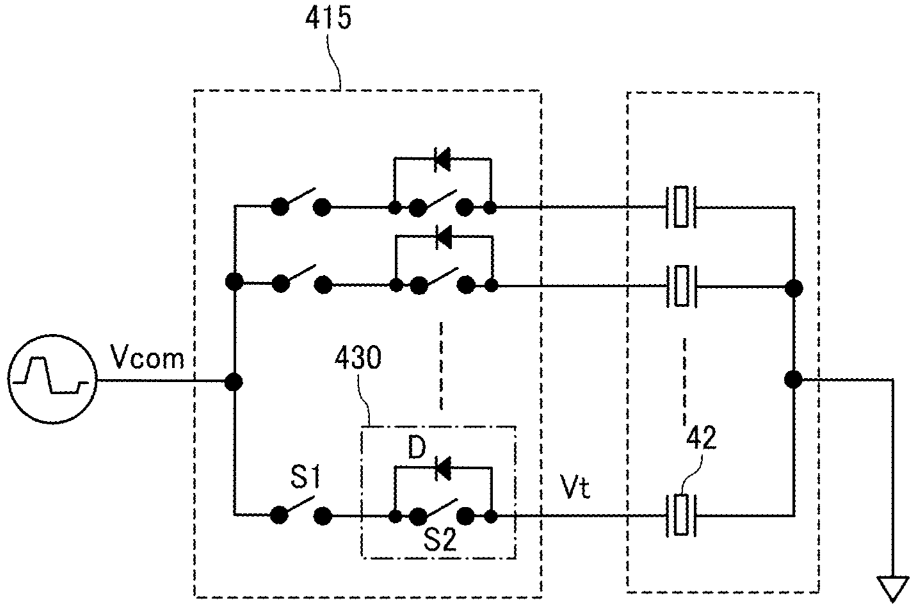
FIG. 16 is a circuit diagram of a portion of the switch array to adjust the drive voltage waveform of the head driver according to a fourth embodiment.

FIG. 16 is a circuit diagram of a portion of the switch array 415 to adjust a drive voltage waveform of the head driver 410 according to the fourth embodiment.

Figure 17:
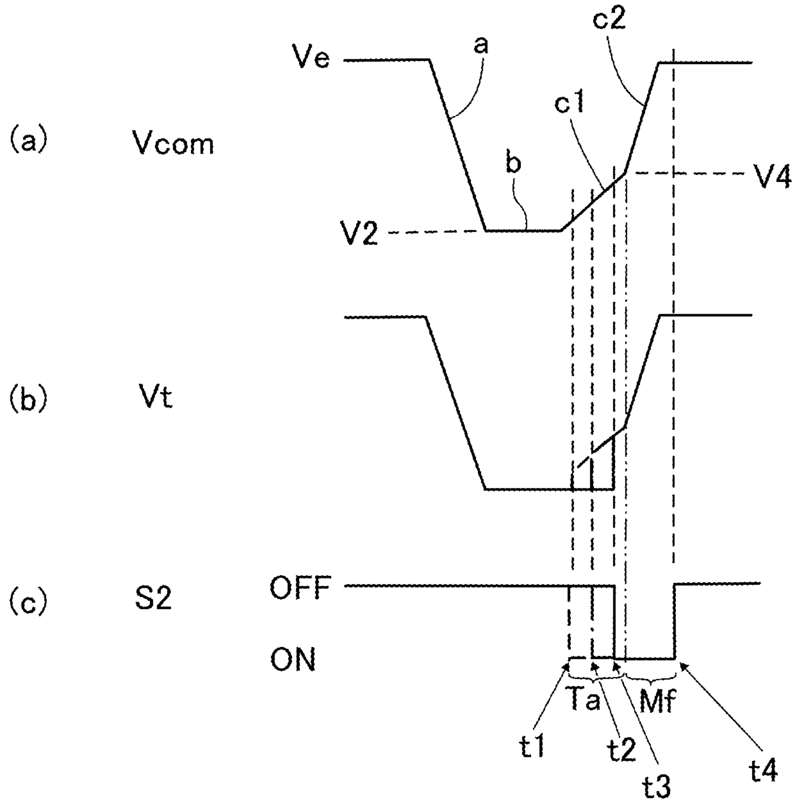
FIG. 17 is a waveform chart illustrating the drive voltage waveform of the head driver according to the fourth embodiment.

FIG. 17 is a waveform chart illustrating the drive voltage waveform of the head driver 410 according to the fourth embodiment.

The switch array 415 in the first embodiment includes switching units 430 coupled in series to the first switching S1 for each nozzle 11. The switching unit 430 includes a parallel circuit of the second switch S2 and a diode "D".

The common drive waveform Vcom is input to the parallel circuit (switching unit 430) of the second switch S2 and the diode D via the first switch S1. Then, a drive waveform Vt generated by trimming the common drive waveform Vcom is applied to an individual electrode of the piezoelectric element 42.

The first switch S1 selects application or non-application of the drive voltage waveform to the piezoelectric element 42. That is, the first switch S1 selects the piezoelectric element 42 (nozzle 11) to which the common drive waveform Vcom as a drive voltage waveform is applied. The head drive controller 400 in the first embodiment includes the first switch S1 on a front stage (left side in FIG. 16) of the second switch S2. However, the first switch S1 may be disposed on a rear stage (right side in FIG. 16) of the second switch S2.

The second switch S2 is a switch to select passing or non-passing of the common drive waveform Vcom as a drive voltage waveform applied to the piezoelectric element 42 of the head 1. The second switch S2 is used to trim the drive voltage waveform (common drive waveform Vcom). The second switch S2 is controlled to be turned on or turned off based on the trimming data Td and the count data of the counter 428. The second switch S2 selects a waveform portion of the common drive waveform Vcom to be passed through the second switch S2 to the piezoelectric element 42 (nozzle 11) to which the first switch S1 selects to apply the common drive waveform Vcom.

Diodes D are respectively coupled in parallel with the second switches S2. Cathodes of the diodes D are respectively coupled to input ends of the second switches S2 from each of which the common drive waveform Vcom is input to the second switch S2. Anodes of the diodes D are respectively coupled to the individual electrodes of the piezoelectric elements 42.

Thus, the diode D is coupled to the second switch S2 in a direction opposite to a rising waveform element of the drive voltage waveform. The rising waveform element in the fourth embodiment is a contraction waveform element that contracts the pressure chamber 21. Conversely, the diode D is coupled to the second switch S2 in a forward direction with respect to a falling waveform element of the drive voltage waveform and a holding waveform element that holds a potential fallen by the falling waveform element. The falling waveform element in the fourth embodiment is an expansion waveform element to expand the pressure chamber 21. The expansion waveform element and the holding waveform element are applied to the piezoelectric element 42 via the diode D. In other words, discharge of the piezoelectric element 42 is performed by the diode D.

The switching unit 430 in the fourth embodiment inputs the common drive waveform Vcom having a drive voltage waveform illustrated in FIG. 17(*a*), for example.

The common drive waveform Vcom is a discharge waveform to pressurize the liquid in the pressure chamber 21 and discharge the liquid from the nozzle 11. The common drive waveform Vcom includes an expansion waveform element a, a holding waveform element b, a first contraction waveform element c1, and a second contraction waveform element c2 in time series.

The expansion waveform element a decreases from a reference potential Ve to a potential V2 to expand the pressure chamber 21. The reference potential Ve is also referred to as an intermediate potential. The holding waveform element b holds the potential V2 that is fallen from the referential potential Ve by the expansion waveform element a.

The first contraction waveform element c1 rises from the potential V2 held by the holding waveform element b to a potential V4 to contract the pressure chamber 21. The second contraction waveform element c2 rises from the potential V4 at a rising end of the first contraction waveform element c1 to the reference potential Ve to contract the pressure chamber 21 and discharge the liquid from the nozzle 11.

The first contraction waveform element c1 is a waveform element, a slew rate (changing amount per unit time) of which is smaller than a slew rate of the second contraction waveform element c2. In other words, the first contraction waveform element c1 is a waveform element, a falling time constant "tr" of which is larger than a falling time constant tr of the second contraction waveform element c2.

The drive voltage waveform according to the fourth embodiment thus configured controls a transition of the second switch S2 from an ON-state to an OFF-state by using, as the trimming area Ta, a time region of the first contraction waveform element c1 having a slew rate smaller than a slew rate of an expansion process of the pressure chamber 21 by the second contraction waveform element c2. The head drive controller 400 turns off the second switch S2 to block the common drive waveform Vcom not to pass through the second switch S2 (non-passing state).

For example, as illustrated in FIG. 17(*c*), the second switch S2 is switched from the OFF-state to the ON-state at a time point after the rising start time point of the first contraction waveform element c1 and before the rising end time point of the first contraction waveform element c1. Then, the second switch S2 is switched from the ON-state to the OFF-state at a time point t4 after the rising end time point of the second contraction waveform element c2.

As a result, as illustrated in FIG. 17(*b*), the drive waveform Vt applied to the piezoelectric element 42 rises from the holding potential V2 to a potential of the first contraction waveform element c1 when the second switch S2 is turned on (ON-state). The drive waveform Vt rises in accordance with waveform portions of the first contraction waveform element c1 and the second contraction waveform element c2 after the potential rises.

For example, at a time point t1 in FIG. 17(*c*), the second switch S2 is turned on (ON-state) as indicated by a broken line. Then, the second switch S2 is switched from the ON-state to the OFF-state at a time point t4 after the rising end time point of the second contraction waveform element c2. At this time, the drive waveform Vt rises from the potential V2 to a potential of the first contraction waveform element c1 at the time point t1 as indicated by a broken line in FIG. 17(*b*). The drive waveform Vt rises according to the waveform portion of the first contraction waveform element c1 and the second contraction waveform element c2 after the time point t1.

Further, at the time point t2 in FIG. 17(*c*), the second switch S2 is turned on (ON-state) as indicated by a dash-single-dot line. Then, the second switch S2 is switched from the ON-state to the OFF-state at a time point t4 after the rising end time point of the second contraction waveform element c2. At this time, the drive waveform Vt rises from the potential V2 to a potential of the first contraction waveform element c1 at the time point t2 as indicated by a dash-single-dot line in FIG. 17(*b*). The drive waveform Vt rises according to the waveform portion of the first contraction waveform element c1 and the second contraction waveform element c2 after the time point t2.

Further, at the time point t3 in FIG. 17(*c*), the second switch S2 is turned on (ON-state) as indicated by a solid line. Then, the second switch S2 is switched from the ON-state to the OFF-state at a time point t4 after the rising end time point of the second contraction waveform element c2. At this time, the drive waveform Vt rises from the potential V2 to a potential of the first contraction waveform element c1 at the time point t3 as indicated by a solid line in FIG. 17(*b*). The drive waveform Vt rises according to the waveform portion of the first contraction waveform element c1 and the second contraction waveform element c2 after the time point t3.

As described above, the first contraction waveform element c1 is formed as the trimming area Ta before a meniscus-pushing step Mf in which a meniscus of a liquid in the nozzle 11 is pushed by a contraction of the pressure chamber 21 by the first contraction waveform element c1. The first contraction waveform element c1 serves as a voltage rising portion of the drive voltage waveform having a reduced slew rate smaller than the slew rate of the second contraction waveform element c2. Then, the head drive controller 400 adjusts a timing at which the second switch S2 is switched from the OFF-state (non-passing state) to the ON-state (passing state) in the trimming area Ta to trim the drive voltage waveform (common drive waveform Vcom). The second switch S2 is used to trim the drive voltage waveform (common drive waveform Vcom).

The circuitry (head controller 401) is configured to turn off the switch (second switch S2) in the first contraction waveform element c1 to cause the switch (second switch S2) to select the non-passing in the first contraction waveform element c1 to trim a portion in the first contraction waveform element c1 to generate a drive waveform Vt to be applied to the head 1.

An amount of a voltage change when an ON timing of the second switch S2 in the trimming area Ta is shifted is much smaller than an amount of voltage change when the ON timing of the second switch S2 in the meniscus-pushing process Mf is shifted. As a result, the discharge characteristics are not significantly shifted, and the head drive controller 400 thus can reduce variations in the discharge characteristics.

Next, the head drive controller 400 according to a fifth embodiment of the present disclosure is described with reference to FIGS. 18 and 19.

Figure 18:
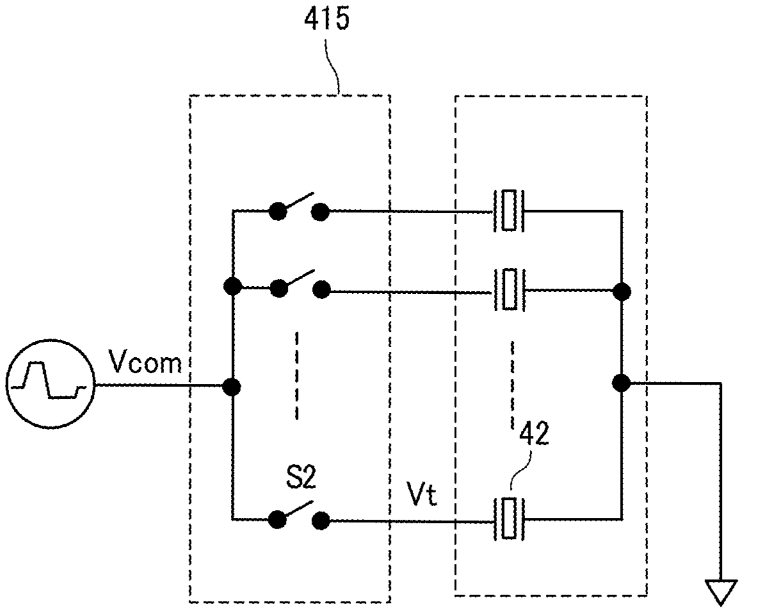
FIG. 18 is a circuit diagram of a portion of the switch array to adjust a drive voltage waveform of the head driver according to a fifth embodiment.

FIG. 18 is a circuit diagram of a portion of the switch array 415 to adjust a drive voltage waveform of the head driver 410 according to the fifth embodiment.

Figure 19:
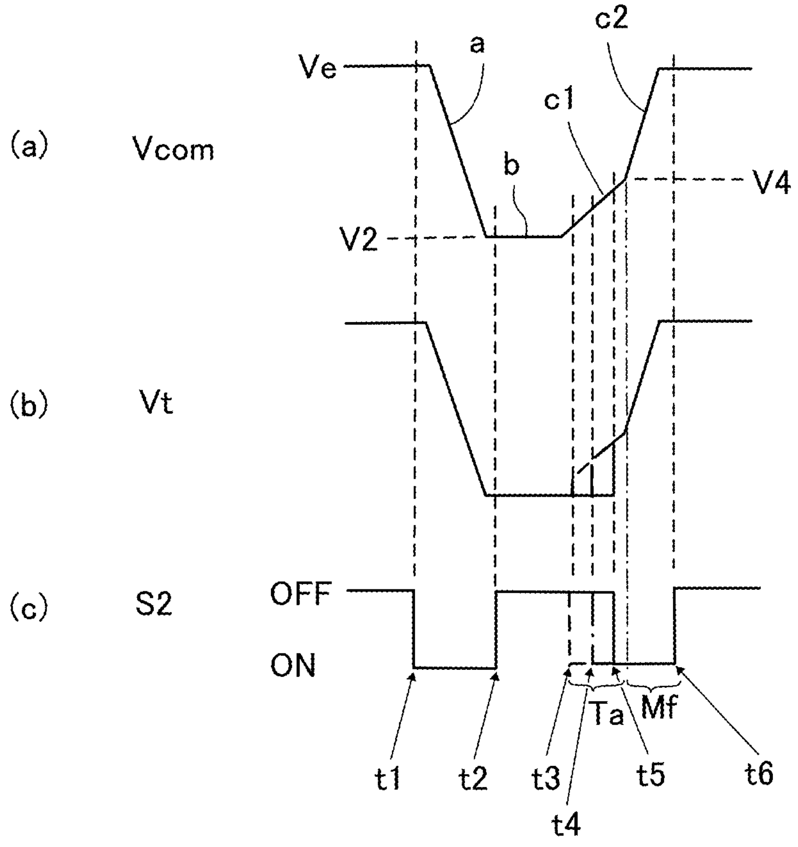
FIG. 19 is a waveform chart illustrating the drive voltage waveform of the head driver according to the fifth embodiment.

FIG. 19 is a waveform chart illustrating the drive voltage waveform of the head driver 410 according to the fifth embodiment.

The switch array 415 in the fifth embodiment includes the second switch S2 as a switch. The common drive waveform Vcom is input to the second switch S2 and trimmed by the second switch S2, and the trimmed drive waveform Vt is applied to the individual electrode side of the piezoelectric element 42. That is, the head drive controller 400 in the fifth embodiment does not use the diode D used in each of the above first to fourth embodiments.

The second switch S2 selects the piezoelectric element 42 (nozzle 11) to which the common drive waveform Vcom as a drive voltage waveform is applied. The second switch S2 is a switch to select passing or non-passing of the common drive waveform Vcom as a drive voltage waveform applied to the piezoelectric element 42 of the head 1. The second switch S2 is used to trim the drive voltage waveform (common drive waveform Vcom).

The switching unit 430 in the fifth embodiment inputs the common drive waveform Vcom having a drive voltage waveform illustrated in FIG. 17(*a*), for example.

The common drive waveform Vcom is a discharge waveform to pressurize the liquid in the pressure chamber 21 and discharge the liquid from the nozzle 11. The common drive waveform Vcom includes an expansion waveform element a, a holding waveform element b, a first contraction waveform element c1, and a second contraction waveform element c2 in time series.

The expansion waveform element a decreases from a reference potential Ve to a potential V2 to expand the pressure chamber 21. The reference potential Ve is also referred to as an intermediate potential. The holding waveform element b holds the potential V2 that is fallen from the referential potential Ve by the expansion waveform element a.

The first contraction waveform element c1 rises from the potential V2 held by the holding waveform element b to a potential V4 to contract the pressure chamber 21. The second contraction waveform element c2 rises from the potential V4 at a rising end of the first contraction waveform element c1 to the reference potential Ve to contract the pressure chamber 21 and discharge the liquid from the nozzle 11.

The first contraction waveform element c1 is a waveform element, a slew rate (changing amount per unit time) of which is smaller than a slew rate of the second contraction waveform element c2. In other words, the first contraction waveform element c1 is a waveform element, a falling time constant "tr" of which is larger than a falling time constant tr of the second contraction waveform element c2.

In the drive voltage waveform according to the fifth embodiment thus configured, the second switch unit S2 is turned on (ON-state) during a time period from a time point t1 to a time point t2 including the expansion waveform element "a" when the common drive waveform Vcom is applied to the piezoelectric element 42 as illustrated in FIG. 19(*c*).

As a result, as illustrated in FIG. 19(*b*), the expansion waveform element a of the common drive waveform Vcom passes through the second switch S2, and the drive waveform Vt including the expansion waveform element a is applied to the piezoelectric element 42.

The drive voltage waveform according to the fifth embodiment thus configured controls a transition of the second switch S2 from an ON-state to an OFF-state by using, as the trimming area Ta, a time region of the first contraction waveform element c1 having a slew rate smaller than a slew rate of a contraction process of the pressure chamber 21 by the second contraction waveform element c2 as similar to the fourth embodiment. The head drive controller 400 turns off the second switch S2 to block the common drive waveform Vcom not to pass through the second switch S2 (non-passing state).

For example, as illustrated in FIG. 19(*c*), the second switch S2 is switched from the OFF-state to the ON-state at a time point after the rising start time point of the first contraction waveform element c1 and before the rising end time point of the first contraction waveform element c1. Then, the second switch S2 is switched from the ON-state to the OFF-state at a time point t4 after the rising end time point of the second contraction waveform element c2.

As a result, the drive waveform Vt applied to the piezoelectric element 42 rises from the holding potential V2 to a potential of the first contraction waveform element c1 when the second switch S2 is turned on (ON-state) as illustrated in FIG. 19(*b*). The drive waveform Vt rises in accordance with waveform portions of the first contraction waveform element c1 and the second contraction waveform element c2 after the potential rises.

For example, at a time point t3 in FIG. 19(*c*), the second switch S2 is turned on (ON-state) as indicated by a broken line. Then, the second switch S2 is switched from the ON-state to the OFF-state at a time point t6 after the rising end time point of the second contraction waveform element c2. At this time, the drive waveform Vt rises from the potential V2 to a potential of the first contraction waveform element c1 at the time point t3 as indicated by a broken line in FIG. 19(*b*). The drive waveform Vt rises according to the waveform portion of the first contraction waveform element c1 and the second contraction waveform element c2 after the time point t3.

Further, at the time point t4 in FIG. 19(*c*), the second switch S2 is turned on (ON-state) as indicated by a dash-single-dot line. Then, the second switch S2 is switched from the ON-state to the OFF-state at a time point t6 after the rising end time point of the second contraction waveform element c2. At this time, the drive waveform Vt rises from the potential V2 to a potential of the first contraction waveform element c1 at the time point t4 as indicated by a dash-single-dot line in FIG. 19(*b*). The drive waveform Vt rises according to a waveform portion of the first contraction waveform element c1 and the second contraction waveform element c2 after the time point t4.

Further, at the time point t5 in FIG. 19(*c*), the second switch S2 is turned on (ON-state) as indicated by a solid line. Then, the second switch S2 is switched from the ON-state to the OFF-state at a time point t6 after the rising end time point of the second contraction waveform element c2. At this time, the drive waveform Vt rises from the potential V2 to a potential of the first contraction waveform element c1 at the time point t5 as indicated by a solid line in FIG. 19(*b*). The drive waveform Vt rises according to a waveform portion of the first contraction waveform element c1 and the second contraction waveform element c2 after the time point t5.

As described above, the first contraction waveform element c1 is formed as the trimming area Ta before a meniscus-pushing step Mf in which a meniscus of a liquid in the nozzle 11 is pushed by a contraction of the pressure chamber 21 by the second contraction waveform element c2. The first contraction waveform element c1 serves as a voltage rising portion of the drive voltage waveform having a reduced slew rate smaller than the slew rate of the second contraction waveform element c2. Then, the head drive controller 400 adjusts a timing at which the second switch S2 is switched from the OFF-state (non-passing state) to the ON-state (passing state) in the trimming area Ta to trim the drive voltage waveform (common drive waveform Vcom). The second switch S2 is used to trim the drive voltage waveform (common drive waveform Vcom).

An amount of a voltage change when an ON timing of the second switch S2 in the trimming area Ta is shifted is much smaller than an amount of voltage change when the ON timing of the second switch S2 in the meniscus-pushing process Mf is shifted. As a result, the discharge characteristics are not significantly shifted, and the head drive controller 400 thus can reduce variations in the discharge characteristics.

As described above, the second switch S2 also selects whether to apply or not to apply the common drive waveform Vcom to the piezoelectric element 42. Thus, the head drive controller 400 does not have to include the first switch S1 and the diode D included in each of the above first to fourth embodiments so the head drive controller 400 can reduce a size of the head drive controller 400.

Next, the head drive controller 400 according to a sixth embodiment of the present disclosure is described with reference to FIG. 20.

Figure 20:
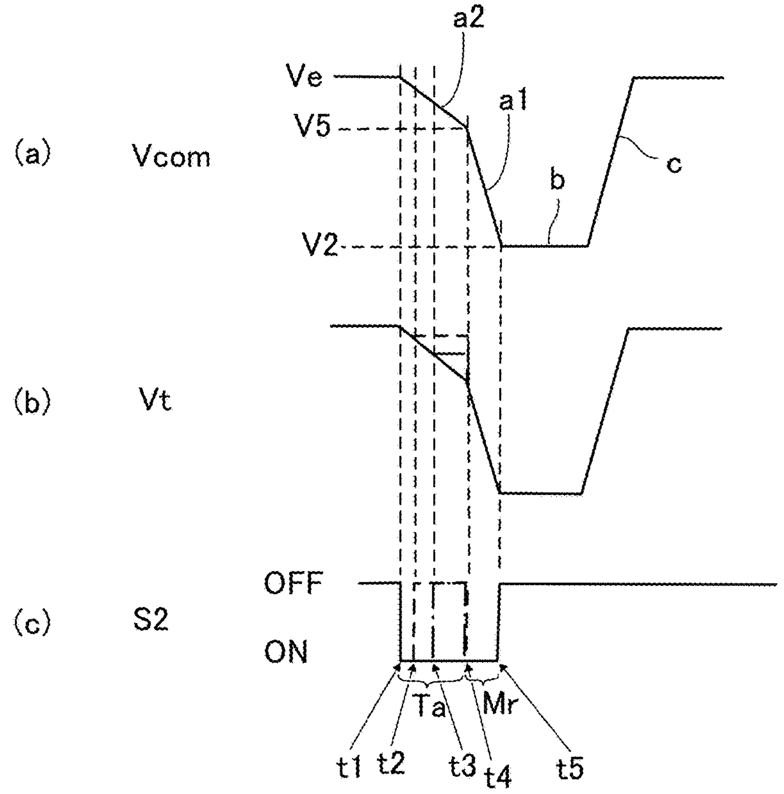
FIG. 20 is a waveform chart of the drive voltage waveform of the head drive controller according a sixth embodiment.

FIG. 20 is a waveform chart of the drive voltage waveform of the head drive controller 400 according to the sixth embodiment.

A configuration of the switch array 415 of the head driver 410 in the second embodiment is made similar to the configuration of the switch array 415 in the first embodiment (see FIG. 12).

The switching unit 430 in the sixth embodiment inputs the common drive waveform Vcom having a drive voltage waveform illustrated in FIG. 20(*a*), for example.

The common drive waveform Vcom is a discharge waveform to pressurize the liquid in the pressure chamber 21 and discharge the liquid from the nozzle 11. The common drive waveform Vcom includes a second expansion waveform element a2, a first expansion waveform element a1, a holding waveform element b, and a contraction waveform element c in time series. The second expansion waveform element a2 is disposed in front of (before) the first expansion waveform element a1 in time series in the sixth embodiment.

The second expansion waveform element a2 decreases from a reference potential Ve of a potential V5 to expand the pressure chamber 21. The first expansion waveform element a1 decreases from the potential V5 of the second expansion waveform element a2 to a potential V2 to further expand the pressure chamber 21. The potential V5 is a falling end potential of the second expansion waveform element a2.

The second expansion waveform element a2 is a waveform element, a slew rate (changing amount per unit time) of which is smaller than a slew rate of the first expansion waveform element a1.

The holding waveform element b holds the potential V2 that is fallen from the potential V5 by the first expansion waveform element a1.

The contraction waveform element c rises from the potential V2 held by the holding waveform element b to the reference potential Ve to contract the pressure chamber 21 and discharge the liquid from the nozzle 11.

The drive voltage waveform according to the sixth embodiment thus configured controls a transition of the second switch S2 from an ON-state to an OFF-state by using, as a trimming area Ta, a time region of the second expansion waveform element a2 having a slew rate smaller than a slew rate of an expansion process of the pressure chamber 21 by the first expansion waveform element a1.

For example, as illustrated in FIG. 20(*c*), the second switch S2 is turned on (ON-state) at a time point t1 before a falling start time point of the second expansion waveform element a2. Then, the second switch S2 is turned off (OFF-state) at a time point after a falling start time point of the second expansion waveform element a2 and before a falling end time point of the second expansion waveform element a2. For example, as illustrated in FIG. 20(*c*), the second switch S2 is turned on (ON-state) in a region of the first expansion waveform element a1.

As a result, a drive waveform Vt applied to the piezoelectric element 42 is held at a potential at which the second switch S2 is turned off (OFF-state), and then falls from the held potential to a start potential V5 of the first expansion waveform element a1 as illustrated in FIG. 20(*b*). The drive waveform Vt fall to the start potential V5 of the first expansion waveform element a1 and then changes according to the common drive waveform Vcom.

For example, at a time point t1 in FIG. 20(*c*), the second switch S2 is turned on (ON-state). Then, at a time point t2 in FIG. 20(*c*), the second switch S2 is turned off (OFF-state) as indicated by a broken line, for example. Then, the second switch S2 is switched from the OFF-state to the ON-state at a time point t4, and then the second switch S2 is switched from the ON-state to the OFF-state at a time point t5.

At this time, the drive waveform Vt applied to the piezoelectric element 42 is held at a potential at the time point t2 of the second expansion waveform element a2 as indicated by a broken line in FIG. 20(*b*). Then, the drive waveform Vt fall to the start potential V5 of the first expansion waveform element a1 at the time point t4, and then changes according to the common drive waveform Vcom.

The second switch S2 is switched from the OFF-state to the ON-state at a time point t1 as illustrated in FIG. 20(*c*), and then the second switch S2 is switched from the ON-state to the OFF-state at a time point t3 as indicated by a dash-single-dot linen as illustrated in FIG. 20(*c*). Then, the second switch S2 is switched from the OFF-state to the ON-state at a time point t4, and then the second switch S2 is switched from the ON-state to the OFF-state at a time point t5.

At this time, the drive waveform Vt applied to the piezoelectric element 42 is held at a potential at the time point t3 of the second expansion waveform element a2 as indicated by a dash-single-dot line in FIG. 20(*b*). Then, the drive waveform Vt fall to the start potential V5 of the first expansion waveform element a1 at the time point t4, and then changes according to the common drive waveform Vcom.

The second switch S2 is switched from the OFF-state to the ON-state at a time point t1 as illustrated in FIG. 20(*c*), and then the second switch S2 is switched from the ON-state to the OFF-state at a time point t5 as indicated by a solid line as illustrated in FIG. 20(*c*), for example.

At this time, the drive waveform Vt changes in accordance with the common drive waveform Vcom as indicated by a solid line in FIG. 20(*b*).

As described above, the second expansion waveform element a2 is formed as the trimming area Ta before a meniscus-pulling process Mr in which a meniscus of a liquid in the nozzle 11 is pulled by an expansion of the pressure chamber 21 by the first expansion waveform element a1. The second expansion waveform element a2 serves as a voltage drop portion of the drive voltage waveform having a reduced slew rate smaller than the slew rate of the first expansion waveform element a1.

Then, the head drive controller 400 adjusts a timing at which the second switch S2 is switched from the ON-state (passing state) to the OFF-state (non-passing state) in the trimming area Ta to trim the drive voltage waveform (common drive waveform Vcom). The second switch S2 is used to trim the drive voltage waveform (common drive waveform Vcom).

An amount of a voltage change when an OFF timing of the second switch S2 in the trimming area Ta is shifted is much smaller than an amount of voltage change when the OFF timing of the second switch S2 in the meniscus-pulling process Mr is shifted. As a result, the discharge characteristics are not significantly shifted, and the head drive controller 400 thus can reduce variations in the discharge characteristics.

Next, the head drive controller 400 according to a seventh embodiment of the present disclosure is described with reference to FIG. 21.

Figure 21:
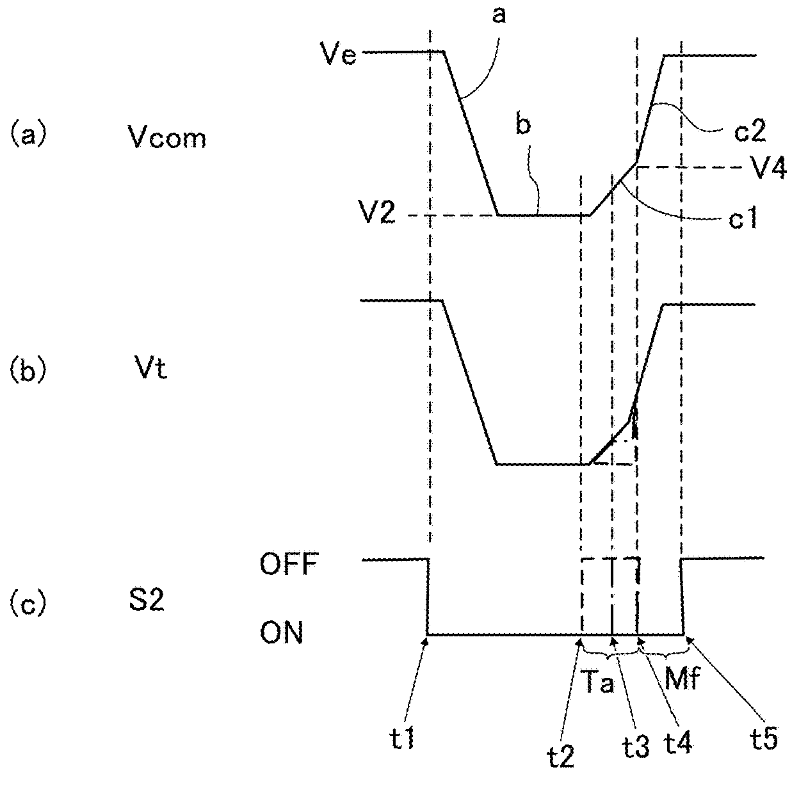
FIG. 21 is a waveform chart of the drive voltage waveform of the head drive controller according to a seventh embodiment.

FIG. 21 is a waveform chart of the drive voltage waveform of the head drive controller 400 according to the seventh embodiment.

A configuration of the switch array 415 of the head driver 410 in the seventh embodiment is made similar to the configuration of the switch array 415 in the fifth embodiment (see FIG. 18).

The second switch S2 as a switching unit in the seventh embodiment inputs the common drive waveform Vcom having a drive voltage waveform illustrated in FIG. 21(*a*), for example.

The common drive waveform Vcom is a discharge waveform to pressurize the liquid in the pressure chamber 21 and discharge the liquid from the nozzle 11. The common drive waveform Vcom includes an expansion waveform element a, a holding waveform element b, a first contraction waveform element c1, and a second contraction waveform element c2 in time series.

The expansion waveform element a decreases from a reference potential Ve to a potential V2 to expand the pressure chamber 21. The reference potential Ve is also referred to as an intermediate potential. The holding waveform element b holds the potential V2 that is fallen from the referential potential Ve by the expansion waveform element a.

The first contraction waveform element c1 rises from the potential V2 held by the holding waveform element b to a potential V4 to contract the pressure chamber 21. The second contraction waveform element c2 rises from the potential V4 at a rising end of the first contraction waveform element c1 to the reference potential Ve to contract the pressure chamber 21 and discharge the liquid from the nozzle 11.

The first contraction waveform element c1 is a waveform element, a slew rate (changing amount per unit time) of which is smaller than a slew rate of the second contraction waveform element c2. In other words, the first contraction waveform element c1 is a waveform element, a falling time constant “tr” of which is larger than a falling time constant tr of the second contraction waveform element c2.

In the drive voltage waveform according to the seventh embodiment thus configured, the second switch S2 is turned on (ON-state) from a time point t1 including the expansion waveform element a, and the ON state is maintained at least before a start time point of the first contraction waveform element c1 when the common drive waveform Vcom is applied to the piezoelectric element 42 as illustrated in FIG. 21(*c*).

As a result, as illustrated in FIG. 21(*b*), the expansion waveform element a of the common drive waveform Vcom passes through the second switch S2, and the drive waveform Vt including the expansion waveform element a is applied to the piezoelectric element 42.

The drive voltage waveform according to the seventh embodiment thus configured controls a transition of the second switch S2 from an ON-state to an OFF-state and from the OFF-state to the ON-state by using, as the trimming area Ta, a time region of the first contraction waveform element c1 having a slew rate smaller than a slew rate of a contraction process of the pressure chamber 21 by the second contraction waveform element c2.

As illustrated in a broken line in FIG. 21(*c*), the second switch S2 is turned off (OFF-state) at a time point t2 before a rising start time point of the first contraction waveform element c1, for example. Then, the second switch S2 is switched from the OFF-state to the ON-state at a rising start time point t4 of the second contraction waveform element c2. Then, the second switch S2 is switched from the ON-state to the OFF-state at a time point t5 after the rising end time point of the second contraction waveform element c2.

At this time, the drive waveform Vt applied to the piezoelectric element 42 is held at a potential V2 even after the time point t2 as indicated by a broken line in FIG. 21(*b*). At a time point t4, the potential rises from the potential V2 to a rising start potential V4 of the second contraction waveform element c2 by the first contraction waveform element c1. The drive waveform Vt is a waveform that changes according to the common drive waveform Vcom after the time point t4.

As illustrated in a dash-single-dot line in FIG. 21(*c*), the second switch S2 is turned off (OFF-state) at a time point t3 after a rising start time point of the first contraction waveform element c1. Then, the second switch S2 is switched from the OFF-state to the ON-state at a rising start time point t4 of the second contraction waveform element c2. Then, the second switch S2 is switched from the ON-state to the OFF-state at a time point t5 after the rising end time point of the second contraction waveform element c2.

At this time, the drive waveform Vt applied to the piezoelectric element 42 is held at a potential at the time point t3 of the first contraction waveform element c1 as indicated by a dash-single-dot line in FIG. 21(*b*). At a time point t4, the potential rises from the potential V2 to the rising start potential V4 of the second contraction waveform element c2 by the first contraction waveform element c1. The drive waveform Vt is a waveform that changes according to the common drive waveform Vcom after the time point t4.

Then, the second switch S2 is switched from the ON-state to the OFF-state at a time point t5 after the rising end time point of the second contraction waveform element c2 as indicated by solid line in FIG. 21(*c*).

At this time, the drive waveform Vt applied to the piezoelectric element 42 changes in accordance with the common drive waveform Vcom as indicated by the solid line in FIG. 21(*b*).

As described above, the first contraction waveform element c1 is formed as the trimming area Ta before a meniscus-pushing step Mf in which a meniscus of a liquid in the nozzle 11 is pushed by a contraction of the pressure chamber 21 by the second contraction waveform element c2. The first contraction waveform element c1 serves as a voltage rising portion of the drive voltage waveform having a reduced slew rate smaller than the slew rate of the second contraction waveform element c2. Then, the head drive controller 400 adjusts a timing at which the second switch S2 is switched from the ON-state (passing state) to the OFF-state (non-passing state) in an area including the trimming area Ta to trim the drive voltage waveform (common drive waveform Vcom). The second switch S2 is used to trim the drive voltage waveform (common drive waveform Vcom).

An amount of a voltage change when an ON timing of the second switch S2 in the trimming area Ta is shifted is much smaller than an amount of voltage change when the ON timing of the second switch S2 in the meniscus-pushing process Mf is shifted. As a result, the discharge characteristics are not significantly shifted, and the head drive controller 400 thus can reduce variations in the discharge characteristics.

As described above, the second switch S2 also selects whether to apply or not to apply the common drive waveform Vcom to the piezoelectric element 42. Thus, the head drive controller 400 does not have to include the first switch S1 and the diode D included in each of the above first to fourth embodiments so the head drive controller 400 can reduce a size of the head drive controller 400.

Next, the head drive controller 400 according to an eighth embodiment of the present disclosure is described with reference to FIG. 22.

Figure 22:
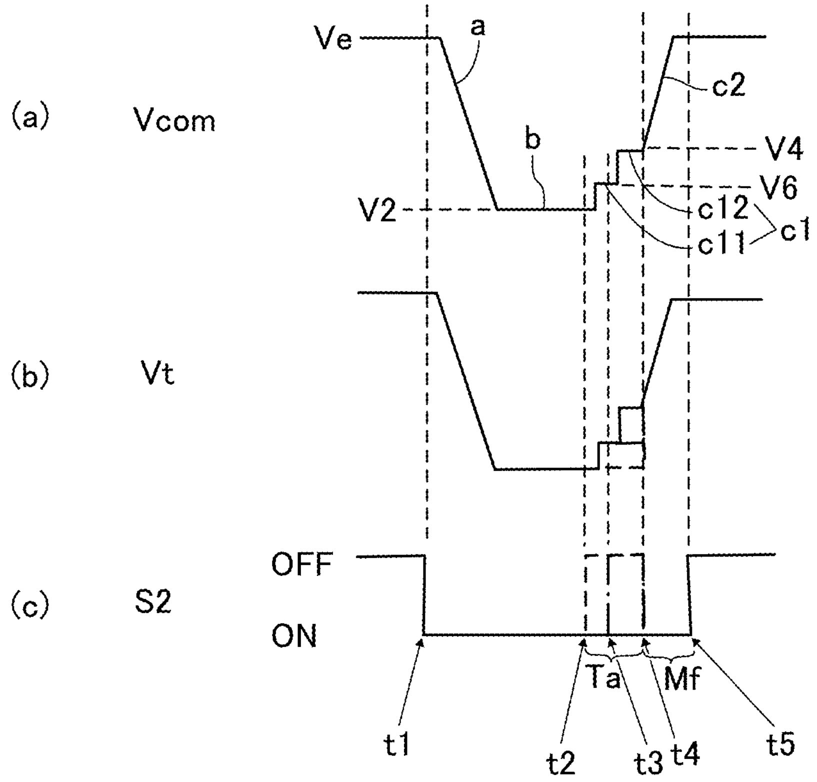
FIG. 22 is a waveform chart of the drive voltage waveform of the head drive controller according to an eighth embodiment.

FIG. 22 is a waveform chart of the drive voltage waveform of the head drive controller 400 according to the eighth embodiment.

A configuration of the switch array 415 of the head driver 410 in the seventh embodiment is made similar to the configuration of the switch array 415 in the fifth embodiment (see FIG. 18).

The second switch S2 as a switching unit in the eighth embodiment inputs the common drive waveform Vcom having a drive voltage waveform illustrated in FIG. 22(*a*), for example.

The common drive waveform Vcom is a discharge waveform to pressurize the liquid in the pressure chamber 21 and discharge the liquid from the nozzle 11. The common drive waveform Vcom includes an expansion waveform element a, a holding waveform element b, a first contraction waveform element c1, and a second contraction waveform element c2 in time series.

The expansion waveform element a decreases from a reference potential Ve to a potential V2 to expand the pressure chamber 21. The reference potential Ve is also referred to as an intermediate potential. The holding waveform element b holds the potential V2 that is fallen from the referential potential Ve by the expansion waveform element a.

The first contraction waveform element c1 rises from the potential V2 held by the holding waveform element b to a potential V4 stepwise to contract the pressure chamber 21. The first contraction waveform element c1 includes a waveform element c11 and a waveform element c12. The waveform element c11 is a potential holding portion that holds a potential V6 rising from the potential V2. The waveform element c12 is a potential holding portion that holds a potential V4 rising from the potential V6.

The second contraction waveform element c2 rises from the potential V4 at a rising end of the first contraction waveform element c1 to the reference potential Ve to contract the pressure chamber 21 and discharge the liquid from the nozzle 11.

In the drive voltage waveform according to the eighth embodiment thus configured, the second switch S2 is turned on (ON-state) from a time point t1 including the expansion waveform element a, and the ON state is maintained at least before a start time point of the first contraction waveform element c1 when the common drive waveform Vcom is applied to the piezoelectric element 42 as illustrated in FIG. 22(*c*).

As a result, as illustrated in FIG. 22(*b*), the expansion waveform element a of the common drive waveform Vcom passes through the second switch S2, and the drive waveform Vt including the expansion waveform element a is applied to the piezoelectric element 42.

The drive voltage waveform according to the eighth embodiment thus configured controls a transition of the second switch S2 from an ON-state to an OFF-state and from the OFF-state to the ON-state by using, as the trimming area Ta, a time region of the first contraction waveform element c1 having a slew rate smaller than a slew rate of a contraction process of the pressure chamber 21 by the second contraction waveform element c2.

As illustrated in a broken line in FIG. 22(*c*), the second switch S2 is turned off (OFF-state) at a time point t2 before a rising start time point of the waveform element c11 of the first contraction waveform element c1, for example. Then, the second switch S2 is switched from the OFF-state to the ON-state at a rising start time point t4 of the second contraction waveform element c2. Then, the second switch S2 is switched from the ON-state to the OFF-state at a time point t5 after the rising end time point of the second contraction waveform element c2.

At this time, the drive waveform Vt applied to the piezoelectric element 42 is held at a potential V2 even after the time point t2 as indicated by a broken line in FIG. 22(*b*). At a time point t4, the potential rises from the potential V2 to the rising start potential V4 of the second contraction waveform element c2 by the first contraction waveform element c1. The drive waveform Vt is a waveform that changes according to the common drive waveform Vcom after the time point t4.

As illustrated in a dash-single-dot line in FIG. 22(*c*), the second switch S2 is turned off (OFF-state) at a time point t3 at which the waveform element c11 of the first contraction waveform element c1 holds the potential V6. Then, the second switch S2 is switched from the OFF-state to the ON-state at a rising start time point t4 of the second contraction waveform element c2. Then, the second switch S2 is switched from the ON-state to the OFF-state at a time point t5 after the rising end time point t5 of the second contraction waveform element c2.

At this time, the drive waveform Vt applied to the piezoelectric element 42 rises from the potential V2 to the potential V6 at the time point t3 of the waveform element c11 of the first contraction waveform element c1 as indicated by a dash-single-dot line in FIG. 21(*b*). At a time point t4, a potential rises from the potential V6 to the rising start potential V4 of the second contraction waveform element c. The drive waveform Vt is a waveform that changes according to the common drive waveform Vcom after the time point t4.

Then, the second switch S2 is switched from the ON-state to the OFF-state at a time point t5 after the rising end time point of the second contraction waveform element c2 as indicated by a solid line in FIG. 22(*c*).

At this time, the drive waveform Vt applied to the piezoelectric element 42 changes in accordance with the common drive waveform Vcom as indicated by the solid line in FIG. 21(*b*).

As described above, the first contraction waveform element c1 is formed as the trimming area Ta before a meniscus-pushing step Mf in which a meniscus of a liquid in the nozzle 11 is pushed by a contraction of the pressure chamber 21 by the second contraction waveform element c2. The first contraction waveform element c1 serves as a voltage rising portion of the drive voltage waveform having a reduced slew rate smaller than the slew rate of the second contraction waveform element c2. Then, the head drive controller 400 adjusts a timing at which the second switch S2 is switched from the OFF-state (non-passing state) to the ON-state (passing state) in an area including the trimming area Ta to trim the drive voltage waveform (common drive waveform Vcom). The second switch S2 is used to trim the drive voltage waveform (common drive waveform Vcom).

An amount of a voltage change when an ON timing of the second switch S2 in the trimming area Ta is shifted is much smaller than an amount of voltage change when the ON timing of the second switch S2 in the meniscus-pushing process Mf is shifted. As a result, the discharge characteristics are not significantly shifted, and the head drive controller 400 thus can reduce variations in the discharge characteristics.

As described above, the second switch S2 also selects whether to apply or not to apply the common drive waveform Vcom to the piezoelectric element 42. Thus, the head drive controller 400 does not have to include the first switch S1 and the diode D included in each of the above first to fourth embodiments so the head drive controller 400 can reduce a size of the head drive controller 400.

When a liquid is discharged using a piezoelectric constant d33 mode, the meniscus-pulling process is performed by a voltage drop of the drive voltage waveform, and the meniscus-pushing process is performed by the voltage rise of the drive voltage waveform. When a liquid is discharged using a piezoelectric constant d31 mode, the meniscus-pulling process is performed by a voltage rise of the drive voltage waveform, and the meniscus-pushing process is performed by the voltage drop of the drive voltage waveform. Even if the vertical relationship of the drive voltage waveform is reversed, the above embodiment can be applied by reading discharge and charge of the piezoelectric element 42 in reverse.

In the above embodiments, trimming usually includes not only matching of the discharge speed and a droplet weight of the multiple nozzles 11 but also includes an adjustment other than matching with other nozzles 11, such as making the droplet size of a particular nozzle larger than droplet sizes of other nozzles.

In the present embodiments, a "liquid" discharged from the head is not particularly limited as long as the liquid has a viscosity and surface tension of degrees dischargeable from the head. Preferably, the viscosity of the liquid is not greater than 30 mPa·s under ordinary temperature and ordinary pressure or by heating or cooling. Examples of the liquid include a solution, a suspension, or an emulsion that contains, for example, a solvent, such as water or an organic solvent, a colorant, such as dye or pigment, a functional material, such as a polymerizable compound, a resin, or a surfactant, a biocompatible material, such as DNA, amino acid, protein, or calcium, or an edible material, such as a natural colorant. Such a solution, a suspension, or an emulsion can be used for, e.g., inkjet ink, surface treatment solution, a liquid for forming components of electronic element or light-emitting element or a resist pattern of electronic circuit, or a material solution for three-dimensional fabrication.

Examples of an energy source for generating energy to discharge liquid include a capacitive actuator other than a piezoelectric actuator (a laminated piezoelectric element or a thin-film piezoelectric element).

Examples of the "liquid discharge apparatus" include, not only apparatuses capable of discharging liquid to materials to which liquid can adhere, but also apparatuses to discharge a liquid toward gas or into a liquid.

The "liquid discharge apparatus" may include units to feed, convey, and eject the material on which liquid can adhere. The liquid discharge apparatus may further include a pretreatment apparatus to coat a treatment liquid onto the material, and a post-treatment apparatus to coat a treatment liquid onto the material, onto which the liquid has been discharged.

The "liquid discharge apparatus" may be, for example, an image forming apparatus to form an image on a sheet by discharging ink, or a three-dimensional fabrication apparatus to discharge a fabrication liquid to a powder layer in which powder material is formed in layers to form a three-dimensional fabrication object.

The "liquid discharge apparatus" is not limited to an apparatus to discharge liquid to visualize meaningful images, such as letters or figures. For example, the liquid discharge apparatus may be an apparatus to form arbitrary images, such as arbitrary patterns, or fabricate three-dimensional images.

The above-described term "material on which liquid can adhere" represents a material on which liquid is at least temporarily adhered, a material on which liquid is adhered and fixed, or a material into which liquid is adhered to permeate. Examples of the "material on which liquid can adhere" include recording media, such as paper sheet, recording paper, recording sheet of paper, film, and cloth, electronic component, such as electronic substrate and piezoelectric element, and media, such as powder layer, organ model, and testing cell. The "material on which liquid can adhere" includes any material on which liquid is adhered, unless particularly limited.

Examples of the "material on which liquid can adhere" include any materials on which liquid can adhere even temporarily, such as paper, thread, fiber, fabric, leather, metal, plastic, glass, wood, and ceramic.

The "liquid discharge apparatus" may be an apparatus to relatively move the head and a material on which liquid can adhere. However, the liquid discharge apparatus is not limited to such an apparatus. For example, the liquid discharge apparatus may be a serial head apparatus that moves the head or a line head apparatus that does not move the head.

Examples of the "liquid discharge apparatus" further include a treatment liquid coating apparatus to discharge a treatment liquid to a sheet to coat the treatment liquid on a sheet surface to reform the sheet surface, and an injection granulation apparatus in which a composition liquid including raw materials dispersed in a solution is injected through nozzles to granulate fine particles of the raw materials.

The terms "image formation", "recording", "printing", "image printing", and "fabricating" used herein may be used synonymously with each other.

The above-described embodiments are illustrative and do not limit the present invention. Thus, numerous additional modifications and variations are possible in light of the above teachings. For example, elements and/or features of different illustrative embodiments may be combined with each other and/or substituted for each other within the scope of the present invention.

Each of the functions of the described embodiments, such as head drive controller 400, the head controller 401, and the head driver 410, for example, may be implemented by one or more processing circuits or circuitry. Processing circuitry includes a programmed processor, as a processor includes circuitry. A processing circuit also includes devices such as an application specific integrated circuit (ASIC), a digital signal processor (DSP), a field programmable gate array (FPGA), and conventional circuit components arranged to perform the recited functions.

The invention claimed is:

1. A head drive controller configured to drive a head to discharge a liquid, the head drive controller comprising:

a drive waveform generator configured to generate a drive voltage waveform; and a switch coupled to the head and the drive waveform generator, the switch configured to select passing or non-passing of the drive voltage waveform to the head, and the drive voltage waveform including:

a first expansion waveform element to expand a pressure chamber in the head; and a second expansion waveform element to expand the pressure chamber stepwise, the second expansion waveform element including two or more potential holding elements to hold a potential, and a holding waveform element after the second expansion waveform element to expand the pressure chamber, an expansion of the pressure chamber by the holding waveform element being larger than an expansion of the pressure chamber by the potential holding elements of the second expansion waveform element, the holding waveform element holding a potential, and the switch configured to select the non-passing of the drive voltage waveform in the second expansion waveform element to trim a portion in the second expansion waveform element of the drive voltage waveform to generate a drive waveform to be applied to the head.

2. The head drive controller according to claim 1, wherein the second expansion waveform element is after the first expansion waveform element in time series.

3. The head drive controller according to claim 1, wherein the drive voltage waveform further includes:

a contraction waveform element to contract the pressure chamber, and the second expansion waveform element is between the first expansion waveform element and the contraction waveform element in time series.

4. A liquid discharge apparatus comprising:

a head configured to discharge a liquid; and the head drive controller according to claim 1.

5. A head drive controller configured to drive a head to discharge a liquid, the head drive controller comprising:

a drive waveform generator configured to generate a drive voltage waveform; and a switch coupled to the head and the drive waveform generator, the switch configured to select passing or non-passing of the drive voltage waveform to the head, and the drive voltage waveform including:

a first contraction waveform element to contract a pressure chamber in the head; and a second contraction waveform element to contract the pressure chamber, the second contraction waveform element having a slew rate larger than a slew rate of the first contraction waveform element, and the switch configured to select the non-passing of the drive voltage waveform in the first contraction waveform element to trim a portion in the first contraction waveform element of the drive voltage waveform to generate a drive waveform to be applied to the head, and the switch is configured to switch from the non-passing of the drive voltage waveform to the passing of the drive voltage waveform within the first contraction waveform, and then to switch from the passing of the drive voltage of the waveform to the non-passing of the drive voltage while still within the first contraction waveform element.

6. The head drive controller according to claim 5, wherein the first contraction waveform element is before the second contraction waveform element in time series.

7. A liquid discharge apparatus comprising:

a head configured to discharge a liquid; and the head drive controller according to claim 5.

* * * * *